(12) United States Patent
Icove et al.

(10) Patent No.: US 8,013,745 B2
(45) Date of Patent: Sep. 6, 2011

(54) PASSIVE MICROWAVE ASSESSMENT OF HUMAN BODY CORE TO SURFACE TEMPERATURE GRADIENTS AND BASAL METABOLIC RATE

(75) Inventors: David J. Icove, Knoxville, TN (US);
Michael B. Zemel, Knoxville, TN (US);
Carl T. Lyster, Knoxville, TN (US);
Neil Feld, Knoxville, TN (US)

(73) Assignee: University of Tennessee Research Foundation, Knoxville, TN (US)

( * ) Notice: Subject to any disclaimer, the term of this patent is extended or adjusted under 35 U.S.C. 154(b) by 203 days.

(21) Appl. No.: 12/483,537

(22) Filed: Jun. 12, 2009

(65) Prior Publication Data

US 2010/0069782 A1 Mar. 18, 2010

Related U.S. Application Data

(63) Continuation-in-part of application No. 11/931,399, filed on Oct. 31, 2007, now Pat. No. 7,724,134, and a continuation-in-part of application No. 12/336,822, filed on Dec. 17, 2008.

(60) Provisional application No. 61/061,513, filed on Jun. 13, 2008, provisional application No. 60/944,217, filed on Jun. 15, 2007.

(51) Int. Cl.
*G08B 23/00* (2006.01)
(52) U.S. Cl. ..................... 340/573.1; 600/549
(58) Field of Classification Search .............. 340/573.1, 340/565, 567; 600/549
See application file for complete search history.

(56) References Cited

U.S. PATENT DOCUMENTS

| | | | |
|---|---|---|---|
| 3,862,423 A | 1/1975 | Kutas |
| 4,190,053 A | 2/1980 | Sterzer |
| 4,386,604 A | 6/1983 | Hershey |
| 4,416,552 A | 11/1983 | Hessemer, Jr. |
| 4,617,442 A | 10/1986 | Okuda |
| 5,023,637 A | 6/1991 | Lorton |

(Continued)

OTHER PUBLICATIONS

Johnson et. al, "Nonionizing Electromagnetic Wave Effects in Biological Materials and Systems," IEEE, v.60, No. 6 Jun. 1972, pp. 692-713 (Table I, p. 694).

(Continued)

*Primary Examiner* — Thomas Mullen
(74) *Attorney, Agent, or Firm* — PCT Law Group, PLLC

(57) ABSTRACT

A passive microwave thermography apparatus uses passive microwave antennas designed for operation, for example, at WARC protected frequencies of 1.400 to 1.427 GHz and 2.690 to 2.70 GHz (for core body gradient temperature measurement) and 10.68 to 10.700 GHz or higher microwave frequency (for surface body gradient temperature measurement) and a related directional antenna or antenna array to measure microwave radiation emanating from an animal, especially, a human body. The antennae may be radially directed toward a point within or on the surface of a human body for comparison with known temperature distribution data for that point and a given ambient temperature. Each frequency band may provide a plurality of adjacent noise measuring channels for measuring microwave noise naturally emitted by the human body. The apparatus measures short-term changes in, for example, core and body surface temperatures to establish a basal metabolic rate. Changes in core body temperature may be stimulated by the administration of food or certain organic and drug-related substances or stress to induce a change in basal metabolic rate over time. These changes correlate directly with a human subject's metabolism rate at rest and under certain dietary constraints and can be used to determine courses of treatment for obesity, metabolic disease, and other disorders. The apparatus can also be used to remotely monitor patients and subjects without physical contact.

26 Claims, 16 Drawing Sheets

U.S. PATENT DOCUMENTS

| | | | |
|---|---|---|---|
| 5,949,845 | A | 9/1999 | Sterzer |
| 6,023,637 | A | 2/2000 | Liu |
| 6,030,342 | A | 2/2000 | Amano et al. |
| 6,477,409 | B2 | 11/2002 | Sakata |
| 6,480,736 | B1 | 11/2002 | Kodama |
| 6,773,159 | B2 | 8/2004 | Kim et al. |
| 6,955,650 | B2 | 10/2005 | Mault |
| 7,291,114 | B2 | 11/2007 | Mault |
| 2002/0126731 | A1* | 9/2002 | Stergiopoulos et al. ...... 600/549 |
| 2004/0249272 | A1* | 12/2004 | Carr .............................. 600/430 |
| 2005/0107692 | A1 | 5/2005 | Li et al. |
| 2009/0012417 | A1* | 1/2009 | Carr .............................. 600/549 |

OTHER PUBLICATIONS

Vesnin et. al "Non-Invasive Monitoring of Body Internal Temperature Using a Passive Microwave Radiometer," Mar. 2006 Physiology and Pharmacology of Temperature Regulation, AZ.

Haslam et al. "Aperture Synthesis Thermography-A New Approach to Passive Microwave Temperature Measurements in the Body," IEEE, v. MTT-32, No. 8, Aug. 1984, pp. 829-835.

J. Cohen et al. CRAF Handbook for Astronomy, Committee on Radio Astronomy Frequencies, European Science Foundation, 3rd Ed., 2005.

Pennes, "Analysis of Tissue and Arterial Blood Temperature in the Resting Human Forearm," Journal of Applied Physiology, v. 1, Aug. 1948, No. 2, pp. 93-121.

Wissler, "Steady-state Temperature Distribution in Man," Jounral of Applied Physiology, 16(4), 1961, pp. 734-740.

Wissler, "Pennes' 1948 Paper Revisited," Journal of Applied Physiology, 85 (1), 1998, pp. 35-41.

Patent Cooperation Treaty (PCT) Written Opinion of the International Searching Authority, Oct. 6, 2009.

Patent Cooperation Treaty (PCT) International Search Report, Oct. 6, 2009.

* cited by examiner

PASSIVE MICROWAVE ASSESSMENT OF HUMAN BODY CORE TO SURFACE TEMPERATURE GRADIENTS AND BASAL METABOLIC RATE

CROSS-REFERENCE

This application claims priority to provisional U.S. Application Ser. No. 60/944,217 filed Jun. 15, 2007, and to provisional U.S. Application Ser. No. 61/061,513 filed Jun. 13, 2008 and is a continuation-in-part of U.S. application Ser. No. 11/931,399 filed Oct. 31, 2007, now U.S. Pat. No. 7,724,134, and of U.S. application Ser. No. 12/336,822 filed Dec. 17, 2008, the entire disclosures of which are hereby incorporated by reference into the present application.

TECHNICAL FIELD

Aspects described herein relate to a passive microwave medical assessment of animal, especially human, body core to surface temperature gradients, for example, for basal metabolic rate determination and include a method for inducing metabolic response changes in response to a stimulus and comparing the measurements of temperature changes over time via passive microwave receiver apparatus with a predicted temperature change.

DISCUSSION OF RELATED ART

Healthy weight management for both adults and children is now a primary concern for most health-care practitioners, as obesity is now the second leading cause of death in the US and is well-recognized in the medical community to be responsible for approximately two thirds of all cardiovascular disease and diabetes and 15-20% of all reported cancers. An indicator of obesity is body mass index (BMI). Body mass index is given by a person's weight in kilograms divided by the square of that person's height in meters. A typical body mass index for a middle aged person is between 19 and 27. A value over 25 is generally recognized as an indicator of overweight and a value over 30 is recognized as an indicator of obesity. Obesity can typically be corrected by diet and exercise, but in extreme situations, surgery to restrict stomach volume and/or bypass a portion of the small intestine have been used to advantageously cause and sustain weight loss.

Basal metabolic rate (BMR) is defined as an amount of energy used per unit of time by a fasting, resting subject to maintain vital function and may be measured as calories consumed per hour per square meter of body surface area or per kilogram of body weight. Basal metabolism is typically measured when a subject is awake, at complete rest, has not eaten for fourteen to eighteen hours and is in a comfortable, warm environment. The measurement of basal metabolism may require the expenditure of as much as an hour of time to determine including approximately thirty minutes for achieving a comfortable state and completing calibration. Stimuli should be avoided and use of a supply mask of air or oxygen and corresponding inlet and outlet tubes may create anxiety and impact the measurement adversely.

When studying obesity in animal or human subjects, a low basal metabolic rate is an indicator or potential causal factor of obesity. In other words, the subject is unable to "burn off" sufficient calories during normal activity and the subject may tend to gain weight no matter how much the subject diets or exercises. Basal metabolic rate may be measured in terms of respiratory quotient (RQ) which is a ratio of volume of carbon dioxide produced to oxygen consumed per unit of time.

Animal subjects, especially of the small, furry variety such as mice or rabbits, have high respiratory rates and fur and radiate less from their skin surface than humans. On the other hand, a few tenths of a degree of change in body temperature is considered large in comparison with human temperatures at skin surface or at the core. Consequently, a system for measuring temperature should have high resolution and be capable of measuring less than a one degree K. temperature change.

Also, a diet or exercise program that may work for one individual may not be successfully used by another due to variations in how individuals react to various food or dietary supplements or exercise. Mault in U.S. Pat. No. 7,291,114 describes a system and method of determining an individualized drug administration protocol comprising measuring actual metabolic rate, for example, using metabolic calorimeter apparatus employing respiratory gas analysis as described in U.S. Pat. No. 6,955,650. Then, Mault determines a metabolic comparison factor by comparing the measured actual metabolic rate to a predetermined standard metabolic rate and adjusting a standardized drug dosage using the comparison factor.

Basal metabolic rate has been recognized as important to the study of medicine since at least the beginning of the twentieth century. U.S. Pat. No. 4,386,604 to Hershey describes the history of the determination of basal metabolic rate by various apparatus. One apparatus known in the art determines the quantity of oxygen consumed within the body to energy via an oxygen filled spirometer and a carbon dioxide absorbing system. Hershey describes a whole-body calorimeter for measuring basal metabolism rate including a chamber 4 into which air may be provided through an inlet port 7 and the air collected at an outlet port 8 analyzed via, for example, relative enthalpy of an inlet airstream and corresponding outlet airstream along with heat generation and heat loss from the whole body.

Tanita Corporation of Japan has been issued U.S. Pat. Nos. 6,477,409 and 6,480,736 directed to a less onerous method of determining basal metabolism rate by calculating the fat-free mass of a subject from bioelectrical impedance. Tanita describes an apparatus and method of calculating by demonstrating an indirect correlation between bioelectrical impedance and basal metabolism through fat-free mass. Current supplying and voltage detecting portions 18, 19 are shown for connection via electrodes to a left and right foot of a subject. Tanita, thus, teaches a prediction for basal metabolism by measuring a bioelectrical impedance of a subject, calculating a fat-free mass and then calculating basal metabolism using a formula involving the calculated fat-free mass. Scatter plots in the '736 patent show observed values versus calculated values of basal metabolism and basal metabolism versus fat-free mass. Also, per FIG. 3, there is shown a correlation of male versus female and age with basal metabolism. Thus, fat-free mass calculated via bioelectric impedance is a predictor of basal metabolism. Other predictors of basal metabolism than bioelectrical impedance are known.

Passive infrared and microwave thermography or radiography is a known medical diagnostic process which primarily relies on the infrared but may be known to utilize emission across the microwave or other energy across the acoustic through the radio frequency spectrum naturally emitted by the body, for example, to record hot and cold areas of the human body, for example, via increases and decreases in blood flow. Accordingly, a passive microwave thermographic receiver utilizes no microwave energy emission from the receiver, only from the human body, and is therefore completely safe in that it results in no damage to living organisms.

The infrared band of frequencies is immediately proximate to the microwave band. Infrared scanning thermography has been utilized for the purposes of determining skin surface temperature. The high, light frequency of infrared energy does not permit the measurement of core body temperature, only skin surface temperature, because light does not penetrate through skin of a human body. On the other hand, infrared thermography, for example, as described in U.S. Pat. No. 3,862,423 to Kutas et al., has been utilized to demonstrate and quantify the differentiation in body temperature found at the skin surface.

The skin itself is an important organ of the body for the purposes of thermoregulation, that is, insuring that a body maintains a constant core temperature. The skin is capable of releasing or acquiring energy at the skin surface depending on the body's environment, for example, being immersed in water or walking on a sunny day in normal atmosphere at the same temperature. One may feel cold in the water and warm in the sun.

Humans are able to control their heat production rate and heat loss rate to maintain a nearly constant core temperature of 37° C. or 310 K. A typical skin/fat layer of a human may have a thickness of 3 mm and conductivity k of 0.3 W/m·K and their surface area may be 1.8 $m^2$. If it is 297 K in air, convection heat transfer to the air for this person is characterized by a coefficient h of 2 W/$m^2$·K. While if immersed in the same temperature of water, the same individual will exhibit a high convection heat transfer rate to the water of 200 W/$m^2$·K. Heat losses due to convection and radiation are calculable to 37 W and 109 W respectively. A typical rate of metabolic heat generation is on the order of 100 W. 109 W exceeds 100 W; so if the person stays in the water too long, the core body temperature will begin to fall. The person may develop hypothermia. The skin temperature in air may be 34° C. while the skin temperature in water may be 28° C. or uncomfortably cold (depending on the individual and how long the person stays in the water).

Two dimensional thermal maps of extended areas of human skin are known in the art as thermograms, a record of a thermograph. Differences in skin temperature on the order of 0.1 degree Centigrade may be detected by such thermograms. The thermogram provides a visual image of temperature differential which, by comparison with a norm, can identify areas of infection at skin level or those reflected at skin level, where temperature differential, for example, exhibited by a tumor buried at depths of one or more centimeters may be detected at skin level. A stimulus of heat differential at a core, such as a tumor, may be amplified at the surface such as skin surface. An example of a method and apparatus for thermal radiation imaging via infrared intensity is given by U.S. Pat. No. 6,023,637 of Liu et al.

Recently, a number of papers and patents have published or issued directed to the use of passive microwave thermography. Most of the efforts and applications of such passive microwave thermography have been directed at the diagnosis of cancerous tumors which are known to demonstrate temperature differentials of one or more degrees Kelvin in comparison with surrounding tissue. As a temperature increase is stimulated within a core of the body, thermal radiation moves toward the body surface and is attenuated at each layer of tissue. The intensity of radiation emitted at each point in a radial direction is directly proportional to the temperature on the absolute scale. A first step in such analysis is to study the natural temperature distribution of, for example, a human body, so that the abnormal may be differentiated from the normal. In this manner, a tumor may be located by its radiating temperature as differentiated from surrounding tissue.

The temperature increase may be reflected back at the interface with the non-cancerous surrounding tissue or be refracted at the interface. Thus, one use of passive microwave thermography is in cancer detection. Other applications than cancer diagnosis include diagnosis of hypothermia, first degree burns (while third degree burns are cold), infected organs, phlebitis, trauma, cysts and the like where a temperature differential from a normal may be detected. Another application suggested for thermograms is the detection of pregnancy. For example, temperatures of the breasts of a female are known to elevate during early stages of pregnancy.

The measurement of thermal microwave radiation from humans, also known as microwave thermography has been typically considered in the frequency range of 0.5 to 10 GHz where the lower the frequency, the greater the depth of penetration within the body under examination. Microwave thermography is described in several U.S. Patents, including U.S. Pat. No. 4,617,442 to Land. Typical uses of microwave thermography have been to diagnose biomedical maladies using static measurements and images of the body as described in U.S. Pat. No. 5,023,637 to Liu and Wang. Sterzer, U.S. Pat. No. 5,949,845, is especially concerned with diagnosis of breast cancer using two displaced microwave antennas to measure the temperature difference between two points of a patient's body tissue. Correlation thermography allows for static non-invasive interior temperature measurements as described in U.S. Pat. No. 4,416,552 to Hessemer, Jr. et al. The '552 patent describes the use of acoustic or electromagnetic transducers. FIG. 8, taken from Johnson and Guy, "Non-ionizing Electromagnetic Wave Effects in Biological Materials and Systems," Proc. IEEE, v. 60, no. 6, June, 1972. pp. 692-713 (Table I, p. 694) provides a log-log plot of electromagnetic wave penetration into different dielectric material of the human body: muscle, skin tissue with high water content versus fat, bone, tissue with low water content. A similar chart is found in the article, "Non-Invasive Monitoring of Body Internal Temperature Using a Passive Microwave Radiometer," presented Mar. 3-6, 2006 at "Physiology and Pharmacology of Temperature Regulation," in Phoenix, Ariz. by Vesnin and Gorbach as taken from A. Barrett & P. Myers, Science, 1975. These graphs tend to show a penetration for 1-10 GHz of a fraction, for example, 0.3 to 0.1 mm respectively for muscle, skin tissue with high water content to 10 to 1 cm respectively for low water content fat and bone where the higher the frequency, the less the radial penetration depth.

The problems uncovered in such passive microwave systems have been related to differentiating human body generated noise from noise generated by other sources. Solutions to the problem have focused on development of special antennae, improved impedance matching and collecting large noise samples on the order of hundreds of megahertz in bandwidth. Haslam et al. in their paper, "Aperture Synthesis Thermography—A New Approach to Passive Microwave Temperature Measurements in the Body," IEEE Transactions on Microwave Theory and Techniques, v. MTT-32, No. 8, August, 1984, pp. 829-835, suggest borrowing the radio astronomical technique of aperture synthesis for a 1.0 to 3.0 GHz antenna linear array of dipole antennae with suitable balancing networks. An antenna array is mounted to the underside of a table having a top comprising a high dielectric constant, low-loss material between the patient and antennas to provide a corresponding improvement in resolution.

Typically, the systems described above have been applied to the human hand, the human leg, a loot, the head, and it has been suggested to utilize the human ear. The walls of the ear canal present an extreme case of achieving a high or low equilibrium temperature while the ear canal closely approximates a core temperature of 98.6° F. (37° C.). In particular, the tympanic membrane has been utilized and relied upon by researchers as an important location for the measurement of core body temperature. For example, a thermocouple thermometer is inserted into the ear canal so as to touch the tympanic membrane and measure a core body temperature. Core body temperature is especially accurate at its source, the hypothalamus. On the other hand, insertion of a temperature probe into via brain tissue to reach the hypothalamus is invasive and not practical. Minimally invasive monitoring of core temperature is practiced under the tongue, insertion into the rectum, under the arm, in the esophagus at or near the level of the heart and in the nasopharyngeal cavity.

The ear has a large capillary system, and its surface, for example, the top of the ear can quickly be called upon to collect or radiate heat depending on low or high environmental temperature. Capillary blood vessels, under control of the sympathetic nervous system, are capable of opening or closing completely and of changing their caliber within wide ranges such that the skin performs remarkably well as a heat exchanger and as a regulator of body temperature.

A passive microwave fire and intrusion detection system is described in the provisional U.S. Application Ser. No. 60/944, 217 filed Jun. 15, 2007, by Icove and Lyster, now, U.S. patent application Ser. No. 11/931,399 filed Oct. 31, 2007, now U.S. Pat. No. 7,724,134. Their invention describes the non-contact measurement of human body temperatures from twenty-five feet to up to 15 meters (50 feet) away from the antenna or array. The application describes the use of protected, noise-free frequencies from the field of radio astronomy for detecting the presence of a human being who radiates a given level of microwave radiation as noise over a microwave frequency range of interest. Radio astronomy is internationally allocated certain bands of frequencies for research purposes according to the 1979 International Telecommunication Union's World Administrative Radio Conference, also known as "WARC-79," (J. Cohen, et al., CRAF *Handbook for Astronomy, Committee on Radio Astronomy Frequencies*, European Science Foundation, 3d Ed. (2005)). These bands are free of microwave active transmission and so are relatively free of noise when used for passive detection, for example, from the stars or planets. Use of passive microwave frequencies at these internationally protected frequencies within the microwave radiation spectra may guarantee that reception is free of interference from active microwave radiation.

Some of the WARC-79 allocated bands are reserved as "PRIMARY exclusive." These PRIMARY exclusive bands include 21.850 to 21.870 MHz, providing a 20 KHz wide band; 1.400 to 1.427 GHz, providing a 27 MHz band; 2.690 to 2.700 GHz, providing a 10 MHz band, 10.680 to 10.700 GHz, providing a 20 MHz band; 15.350 to 15.400 GHz, providing a 50 MHz band; and 23.600 to 24.000 GHz, providing a 400 MHz band. The higher the microwave frequency, the smaller a directional antenna may be. In addition, some WARC allocated bands are labeled as "PRIMARY exclusive" but are restricted according to region of the Earth's surface.

Other frequencies also are set aside and require "Notification of Use" when someone wishes to transmit on these frequencies. These frequencies include 4.950 to 4.990 GHz, providing a 40 MHz band. The 1.6 to 1.7 GHz band is utilized for missile tracking radar but the chances of interference with use in a passive human body temperature detection system would be low. Still others are "PRIMARY shared with active."

Microwave radiation from human subjects is in the form of white noise and at very low amplitude. While passive microwave detection of microwave radiation is known and has been explored, for example, for purposes of tumor diagnosis, improvements in antenna design, electronic circuitry, image analysis and the like remain to be made.

The study of temperature variation in the human body was documented by Pennes, "Analysis of Tissue and Arterial Blood Temperature in the Resting Human Forearm," *Journal of Applied Physiology*, V. 1, August, 1948, No. 2, pp. 93-121. Pennes thoroughly documents radial depth versus body temperature using, for example, rectal thermometers, thermocouples and needle thermocouples penetrating to pre-determined radial depths in a plurality of subjects at given room temperatures. Local rate of tissue heat production is considered along with volume flow of blood. In one experiment, an intentional circulatory occlusion is introduced. The data collected for points around and along the length of the arm from the upper arm to the hand have been questioned and verified by Wissler, "Steady-state Temperature Distribution in Man," *Journal of Applied Physiology*, 16(4), 1961. pp. 734-740 and "Pennes' 1948 Paper Revisited," *Journal of Applied Physiology*, 85(1), 1998, pp. 35-41. In the latter paper, Wissler states at page 40: "Experimental data reported by Pennes are probably as good as we will ever have, unless a non-invasive technique is developed for measuring deep tissue temperatures."

SUMMARY OF EMBODIMENTS, ASPECTS THEREOF AND METHODS

This invention uses microwave radiation emanating from various appendages of a human body to measure precise short-term changes in temperature that correlate with changes in metabolism. By passively receiving WARC protected microwave frequencies and more narrow bandwidth, a plurality of relatively noise-free voltage readings corresponding to different radial depths in human tissue as given by microwave center frequency can be obtained and compared with the Pennes model. The result of a short, one or two minute (or less) assessment can be a radial temperature gradient for a given individual (at different depths of human tissue) for comparison with a norm. An assessment method also comprises the measurement of metabolic response changes at a given depth or at skin surface in response to stimulus by either externally applied temperatures or the controlled use of thermogenic response-inducing liquids, foods or drugs, via exercise as in a known stress test or via other known stress inducing scenarios such as the intentional loud play of disturbing music. A specific dietary plan may be suggested for treatment after assessing the response to such stimuli. Moreover, the measurement or detection of human body temperature may generally provide an overall mass screening of individuals in the event of an epidemic of, for example, the bird flu at border crossings and the like at a gateway such as a border checkpoint, an airport or seaport. Another application may be the remote monitoring of a new-born baby care unit or an intensive care unit for abnormal human body temperature changes.

According to one aspect, one embodiment differs greatly from normal microwave thermography applications in that it measures dynamic responses to various stimuli either externally applied temperatures or the oral ingestion of measured amounts of thermogenic liquids, foods or drugs. This enables assessment of thermogenic responses to, for example, foods and to pharmacological stimuli, thereby providing an assessment of energy metabolism. Since these thermal responses are an indication of an individual's rate of metabolism, an assessment can be used for differential medical diagnoses of energy metabolism, obesity, and metabolic disease.

The application of this embodiment enhances the ability to quantify and map small changes in radiant heat resulting from metabolism. Several applications include the diagnostic assessment of defects in thermogenesis that result in promotion of weight gain and resistance to weight loss during standard caloric-deficit programs. Resultant data will be used to target alternative approaches to weight management to individuals demonstrating such deficits. Other applications include the assessment of patient responses to thermogenic foods and pharmaceuticals to facilitate individualization of treatment.

Unobtrusive and non-contact monitoring of patients reduces the need for constant cleaning and sterilizing of medical apparatus or using disposable prophylactic supplies such as disposable thermometers and thermocouples. This apparatus allows monitoring patient metabolic progress during lifestyle modification programs, patients incapacitated, bedridden, or under intensive care.

An assessment method for assessing human metabolic rate according to one embodiment comprises directing a passive microwave receiver having one or a plurality of noise-measuring channels having a directional antenna along a radial direction toward a given body part or a human under observation. A corresponding radial depth of human body is determined from the received frequency of the passive microwave noise-measuring channel from known data for different types of body tissue such as muscle tissue having low water content and fat tissue having high water content. The location of measurement and radial depth is compared with stored data for temperature of a normal human body at the location and a temperature gradient for the plurality of noise-measuring channels and corresponding radial depths is determined. In accordance with a further embodiment, an assessment method may further comprise introducing a stimulus to the human under observation and determining a temperature gradient for the plurality of noise-measuring channels and corresponding radial depths. In accordance with an aspect of the embodiments, the stimulus comprises ingestion of a substance having the properties of rapid absorption to provoke a transient increase in core body temperature. In accordance with a further aspect, the stimulus may comprise controlled exercise or the inducement of stress through other means. In one embodiment, ingestion of a temperature change inducing substance such as caffeine or nicotine may be followed by measuring temperature, for example, at the skin surface of a high capillary area such as the human ear over time. In one embodiment, a dosage of caffeine may demonstrate a vasoconstrictive response in a hypertensive individual followed by a thermogenic response over a time period, for example, of less than 20 minutes. In an alternative embodiment, a dosage of nicotine may demonstrate a different response in the same individual, for, for example, 40 minutes. These responses may be utilized to assist a nutritionist in the assessment of metabolic response and the prescription of a personalized diet, exercise or other course of treatment if deemed useful. In accordance with a further embodiment, the assessment method may be for use at a gateway for detecting a carrier of infectious disease.

A system for the assessment of human temperature gradients at varying radial depth of a subject comprises a passive microwave receiver for operation, for example, within a selected WARC protected frequency range, each selected frequency range comprising at least one noise measuring channel. The passive microwave receiver comprises a directional antenna for radial direction toward the subject in order to receive natural noise emission at the predetermined WARC protected frequency and an associated human tissue depth. The system further comprises a computer coupled to the passive microwave receiver and memory for storing three dimensional coordinates of a human body and corresponding expected temperatures for the coordinates of blood vessels for comparison with measurements of the at least one noise measuring channel. According to an aspect of such a system, the frequencies for adjacent noise measuring channels and associated tissue depths may be selected to represent intercellular distances for a given type of tissue. According to a further aspect of such a system, other frequencies that are "primary shared with active" such as the 1.6-1.7 GHz band providing 100 MHz bandwidth may be used as a single noise measuring channel or wide bandwidth or sub-divided into adjacent noise measurement channels. Also, the higher the frequency, the closer to skin surface and the smaller a directional antenna may be. In addition, some WARC allocated bands are labeled as "PRIMARY exclusive" and may be used in some embodiments but are restricted according to region of the Earth's surface. Still other microwave frequencies and bandwidths may be utilized which are particularly selected for their being rarely used in a given geographic area.

A further embodiment comprises a passive microwave received for directional application at low microwave frequency for radial placement proximate the hypothalamus for non-invasive measurement of precise core body temperature. The low microwave frequency is chosen to receive radiation from the vicinity of the hypothalamus as a received voltage measurement proportional to temperature. Similarly, a high microwave frequency on the order of 20 GHz and, for example, greater than 100 GHz may be received via a probe placed proximate the ear canal so as to directionally receive radiation from the tympanic membrane for an alternate measurement of core body temperature.

All United States patents referenced above and applications once published are incorporated by reference herein as to their entire contents. All articles referenced herein are incorporated by reference as to any subject matter deemed essential to an understanding of the present invention.

DETAILED DESCRIPTION

Figure 1:
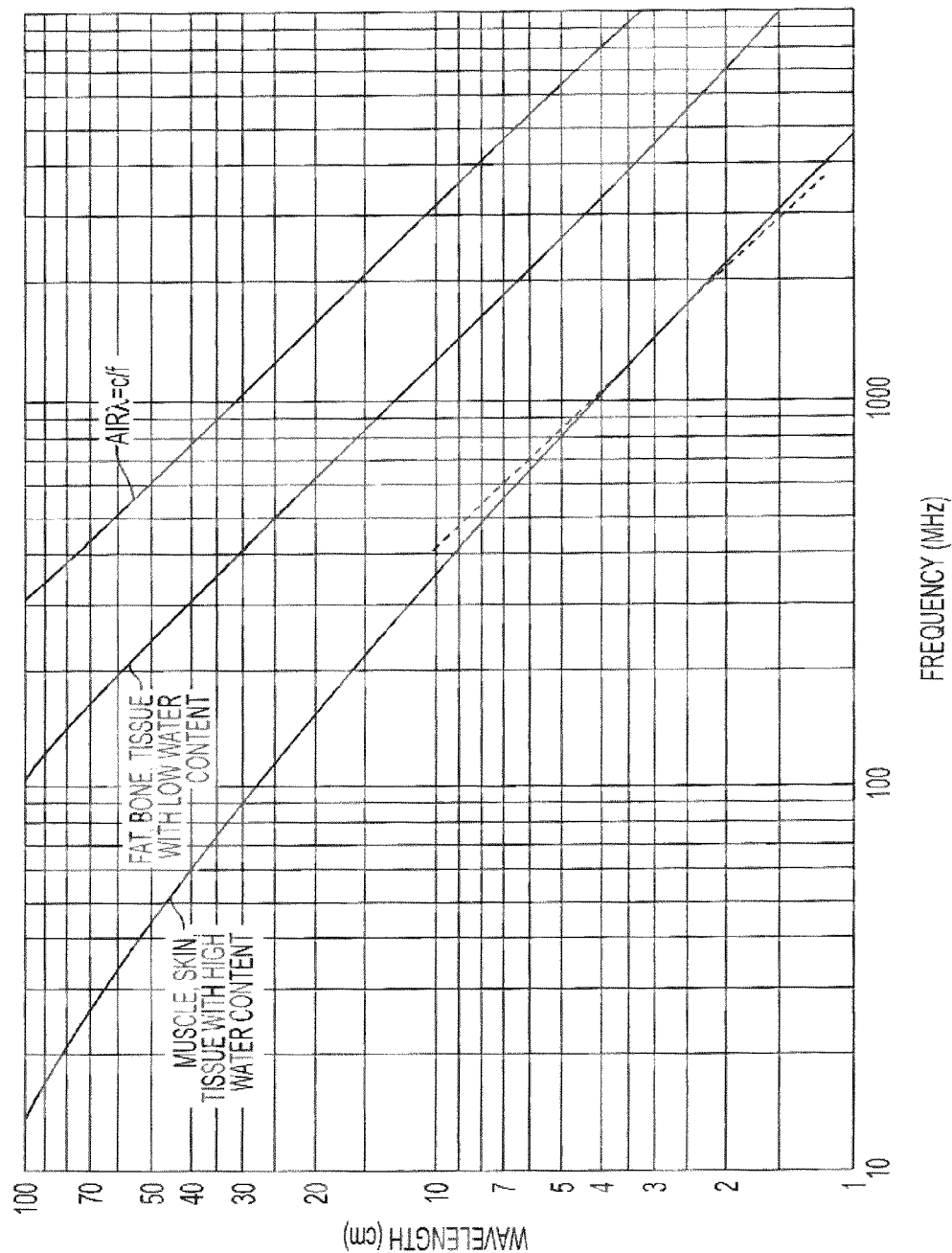
FIG. 1 is an exemplary plot of wavelength versus frequency for different dielectric substances and air, and, in particular, shows exemplary penetrations of microwave radiation into muscle or skin tissue with high water content and into fat or bone tissue with low water content.

The aspects of apparatus for passive microwave assessment summarized above can be embodied in various forms. The following description shows, by way of illustration, combinations and configurations in which the aspects can be practiced. It is understood that the described aspects and/or embodiments are merely examples. It is also understood that one skilled in the art may utilize other aspects and/or embodiments or make structural and functional modifications without departing from the scope of the present disclosure.

As described above, it is known that the human body emits a wide spectrum of electromagnetic radiation. Such radiation includes not only infrared (heat) radiation (primarily from the surface of the skin), but also includes, to a lesser degree, microwave radiation. Indeed, it has been demonstrated that the relative spectral radiance of microwave versus light is on the order of $10^{-8}$; that is, light radiation from the human body is considerably brighter, following a decreasing straight line logarithm curve as frequency decreases (wavelength increases). Such small microwave radiation levels, however, can be detected. Moreover, passive microwave reception occurs without the need for any corresponding emission of microwave radiation by an antenna, thus deeming such apparatus a purely passive device. Since passive microwave thermography relies on the microwave energy naturally emitted by the body, accordingly, it utilizes no external microwave energy and is therefore completely safe and results in no damage to living organisms.

Thus, a passive microwave core or skin temperature detection method in accordance with the aspects described herein can rely upon the fact that thermal radiation from persons can generate a detectable signal in the microwave portion of the electromagnetic spectrum. It is one aspect of such apparatus that a number of protected spectra be utilized in microwave receiver apparatus to provide a plurality of depths of penetration toward the core temperature region of a given body part under analysis. Antennae, preferably passive microwave directional antennae providing some signal strength gain, are utilized to receive different protected frequency ranges. Each WARC protected frequency range may be sub-divided into a plurality of human body noise gathering channels for obtaining voltage levels directly corresponding to temperatures at calculable radial depths of human tissue.

While the human forearm has been studied in considerable detail by Pennes and Wissler, special attention may be given to a temperature model of the ear because of its capability to provide a miniature radiation system for the assessment of radiant heat loss and temperature of the surface of the skin where ear skin has a high degree of capillary involvement. In one embodiment, apparatus may resemble headsets worn for listening to music and comprise small radio astronomy directional antennae for receiving protected WARC frequencies.

Embodiments described herein can use characteristics of microwave radiation at various frequencies in a method and system for thermal measurements of human body temperatures. Because of the high frequency/short wavelength nature of microwaves, microwave radiation can, at lower protected frequencies such as 1.4 GHz (27 MHz band) or 2.69 GHz (10 MHz band) penetrate (that is, a receiver may detect temperatures at radial depths of) several centimeters, sufficient to gather core temperature data at a predetermined depth depending on the composition of the body tissue (and water content) at the location of measurement. While it is known to collect surface skin temperature using devices such as thermocouples and by collecting and measuring infrared radiation, it is also possible to obtain noise-free microwave measurement of skin and just under the skin temperature at the protected WARC frequency of 10.68 to 10.70 GHz (20 MHz band). Microwave radiation may penetrate thick smoke and water vapor, as molecules suspended in the air such that oxygen, water vapor, dust, and smoke do not attenuate the microwave radiation emanating from a human body. In addition, in accordance with aspects herein, any protected bandwidth can be split into many different internationally protected bands of varying bandwidth according to WARC-79 radio astronomy allocations, with each of a plurality of receivers receiving a subset of the emitted microwave radiation. As other bands may be reserved in the future for passive detection, such frequencies and bands may also come within the scope of an embodiment. In addition, other hands in the microwave regions may be utilized, including bands which overlap internationally protected bands and known microwave radio frequencies in a given area subtracted or filtered from results. For example, other frequencies that are "primary shared with active" such as the 1.6-1.7 GHz band providing 100 MHz bandwidth may be used as a single noise measuring channel of 100 MHz or having wide bandwidth or sub-divided into adjacent noise measurement channels within the 100 MHz of this band. A further alternative embodiment regarding the 1.6-1.7 GHz band or other frequency range providing as much as 100 or more megahertz of bandwidth is to provide two 10 MHz wide noise measuring channels spread by a guard band, for example, 50 MHz wide band, from one another. Still other microwave frequencies and bandwidths may be utilized which are particularly selected for their being rarely used for active microwave transmission in a given geographic area.

Figure 2:
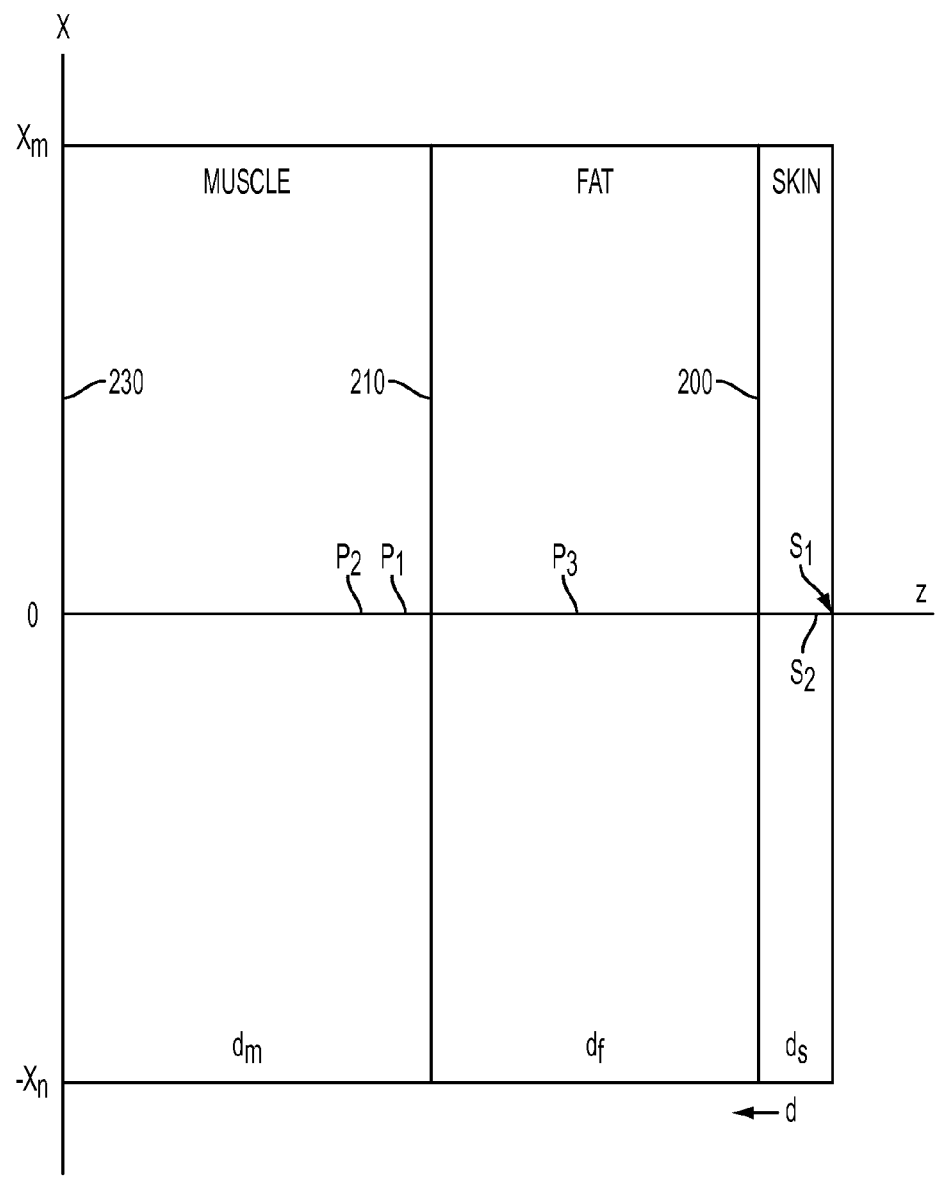
FIG. 2 provides an exemplary plot of increasing depth of microwave wavelength as a function of a skin layer, an underlying fat layer and a further underlying muscle layer, the deeper the penetration, the more likely an accurate reading of body core temperature may be obtained.

FIG. 1 is an exemplary plot of wavelength versus frequency for different dielectric substances and air and, in particular, shows exemplary penetrations of microwave radiation into muscle or skin tissue with high water content and into fat or bone tissue with low water content. To the contrary, the plot of FIG. 1 provides an example of how core temperature may be detected and measured below skin level easily, for example, via apparatus radially directed at an ear or other appendage or central structure of the human body. Following the graph, a microwave signal at 1.4 GHz translates to a radial depth within muscle or skin tissue of high water content on the order of 3 to 4 centimeters or over an inch below skin surface, deep enough to reach human body core temperature. This data is analogous to data collected by Pennes, whose measurements stop short of the bones in mapping the temperature distribution in the upper arm, forearm and hand at different ambient environmental temperatures. In fat or bone tissue with a low water content, the graph translates this frequency to a depth on the order of ten or more centimeters or four inches in depth. Referring briefly to FIG. 2 and depending on the human body part under analysis, a 1.6 to 1.7 GHz microwave band translates to a radial depth on the Z axis of approximately 2 to 3 centimeters. A microwave signal at 2.69 GHz translates to a depth of between one and two centimeters in muscle or skin and a depth of four or five centimeters in fat or bone.

Figure 6A:
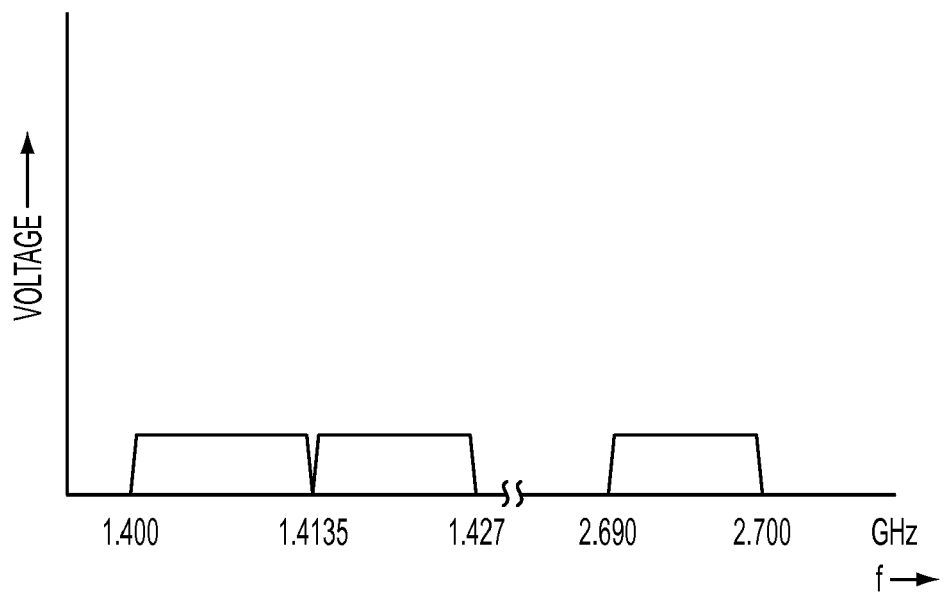
FIG. 6A is a frequency versus amplitude plot of first and second noise measuring channels at center frequencies, for example, of 1.40675 GHz and 1.42025 GHz and a third noise measuring channel centered at 2.695 GHz.

Starting at the human body surface, there is typically skin, then fat and/or muscle and then bone. FIG. 2 provides an exemplary plot of increasing radial depth of microwave wavelength as a function of a skin layer having a radial depth $d_s$, an underlying fat layer having a radial depth $d_f$ and a further underlying muscle layer having a radial depth $d_m$. The deeper the radial penetration of reception of a passive microwave receiver, the more likely an accurate reading of body core temperature may be obtained regardless of ambient temperature. It is an aspect of the passive microwave assessment further described herein to provide temperature gradients by measuring temperature at different depths within the human body at different ambient temperatures paralleling the work of Pennes/Wissler. Referring to FIG. 2, representative points $P_1$ and $P_2$ represent first and second temperature points measured within, for example, muscle tissue at a radial depth along the Z axis within a core of a human body. These may be obtained by first and second noise channels of a first WARC protected frequency range reaching different, closely proximate depths in a predetermined body portion such as a hand, forearm, head, ear or other body part center. Referring to FIG. 6A, two noise-measuring channels at 1.40675 GHz and 1.42025 GHz within the 1.4 to 1.427 GHz range are shown respectively. The 27 MHz bandwidth may be allocated to provide multiple noise measurement channels, not just the two shown.

The first and second channels of FIG. 6A may have guard bands allocated three MHz and be approximately twelve MHz wide each. The pass band of 27 MHz may be more narrowly divided into three, four or more adjacent noise measurement channels of decreasing bandwidth. A further third channel may obtain a less deep $P_3$, for example, in fat tissue with a center WARC protected frequency of 2.695 GHz and a pass band of approximately 9 MHz of noise, per FIG. 6A. Such a channel may likewise be further divided into a plurality of noise measurement channels. Indeed, if the number of channels is increased, the difference in depth between noise measurement frequencies may be decreased to an intra-cell level and actually detect the difference in human tissue heat transfer between radially adjacent cells over time in the radial Z direction of passive microwave noise measurement.

Referring to FIG. 2, interface 200 represents an interface between skin and fat tissue and interface 210 represents an interface between muscle and fat tissue. Interface 230 may represent an interface between muscle tissue and bone tissue. Thermal radiation emitted from a point $P_2$ along a radial Z direction toward a passive microwave antenna receiver is highly attenuated as it reaches point $P_1$ passing through one or more cells, in this case, muscle tissue of high water content. When the radiation reaches interface 210 between muscle tissue and fat tissue of lower water content and a region of decreasing attenuation, a portion of the radiated heat may be reflected back at the interface toward the muscle tissue and at the same time refracted. Similarly, the emitted noise beginning at $P_2$ reaches interface 200 between fat tissue of low water content and skin tissue of high water content. In skin tissue, the signal is highly attenuated and is reflected and refracted as at the interface 210. At the skin surface $S_i$, the impact of a stimulus originating within the body is radiated as microwave energy from the skin surface. Some microwave energy is reflected back at the skin surface into the body. By selecting appropriate frequencies and associated radial depths Z for adjacent noise measuring channels, the degree of reflection and refraction at a tissue interface may be detected and measured.

The radial distance along Z between skin surface $S_i$ and interface 200 may be known from Pennes/Wissler data, derived from such data or experimentally determined for temperature distribution within a human body part, such as an arm, at a given ambient temperature for a given point of measurement. Similarly, the radial distance along Z between interface 200 and interface 210 comprising the fat tissue layer at a given point of measurement may be similarly determined. Finally, the radial distance between fat/muscle interface 210 and muscle/bone interface 230 may be determined. Also, points $P_2$, $P_1$, $P_3$, and $S_2$ may be calculated as per FIG. 1 and Pennes/Wissler data for a given noise measurement channel of a passive microwave receiver receiving at a selected passive microwave frequency range.

If the corresponding radial depth correlates to an arterial or venous blood flow, the temperature of blood flowing in the artery or vein in response to stimuli may be measured over time. The temperature of blood flow in a given artery, vein or capillary may thus be detected by passive microwave reception. According to one embodiment, appropriately directed directional antennae may point at a desired body part whose temperature is to be measured. Moreover, a microwave transmission frequency/wavelength may be selected according to the depth of the desired body part in a body and point of desired temperature measurement on or in that body part. An occlusion may be intentionally introduced in a given artery, vein or capillary. To detect temperature of occluded blood flow, antennae may be focused at the occluded blood flow. Further, a core temperature at a desired radial depth or, alternatively, a skin temperature may be detected through choice of microwave frequency/wavelength corresponding to the depth in the body or its surface respectively. By choice of microwave frequency/wavelength, simultaneous readings of microwave noise over time at different radial depths (different frequencies) may be obtained non-invasively.

Referring to FIG. 2, points $S_1$ and $S_2$ represent points at and just below the skin surface and temperatures can be obtained by a superheterodyne receiver having at least first and second center frequencies at 10.685 and 10.695 GHz for human noise measuring channels, each reaching different radial depths as shown of skin where microwave noise amplitude may be detected as with deeper tissue as a voltage signal and a temperature gradient determined. The ten MHz bandwidth available at 10.68 GHz may be divided into a greater number of noise measuring channels of decreasing bandwidth. All such temperature gradients between/among noise measuring channels may represent a body temperature convection process of heat transfer from a body core outward to the skin or inward toward the core depending on the environment. If the ambient temperature of the environment requires a greater than 100 W metabolic rate, then heat conveys outward as explained above with respect to air and water. If the ambient temperature of the environment requires less than a 100 W metabolic rate, then temperature at the skin will be higher than temperature in the core. Alternatively, known temperature measurement methods such as via passive infrared measurement or thermocouple or other known means may be employed.

Figure 3:
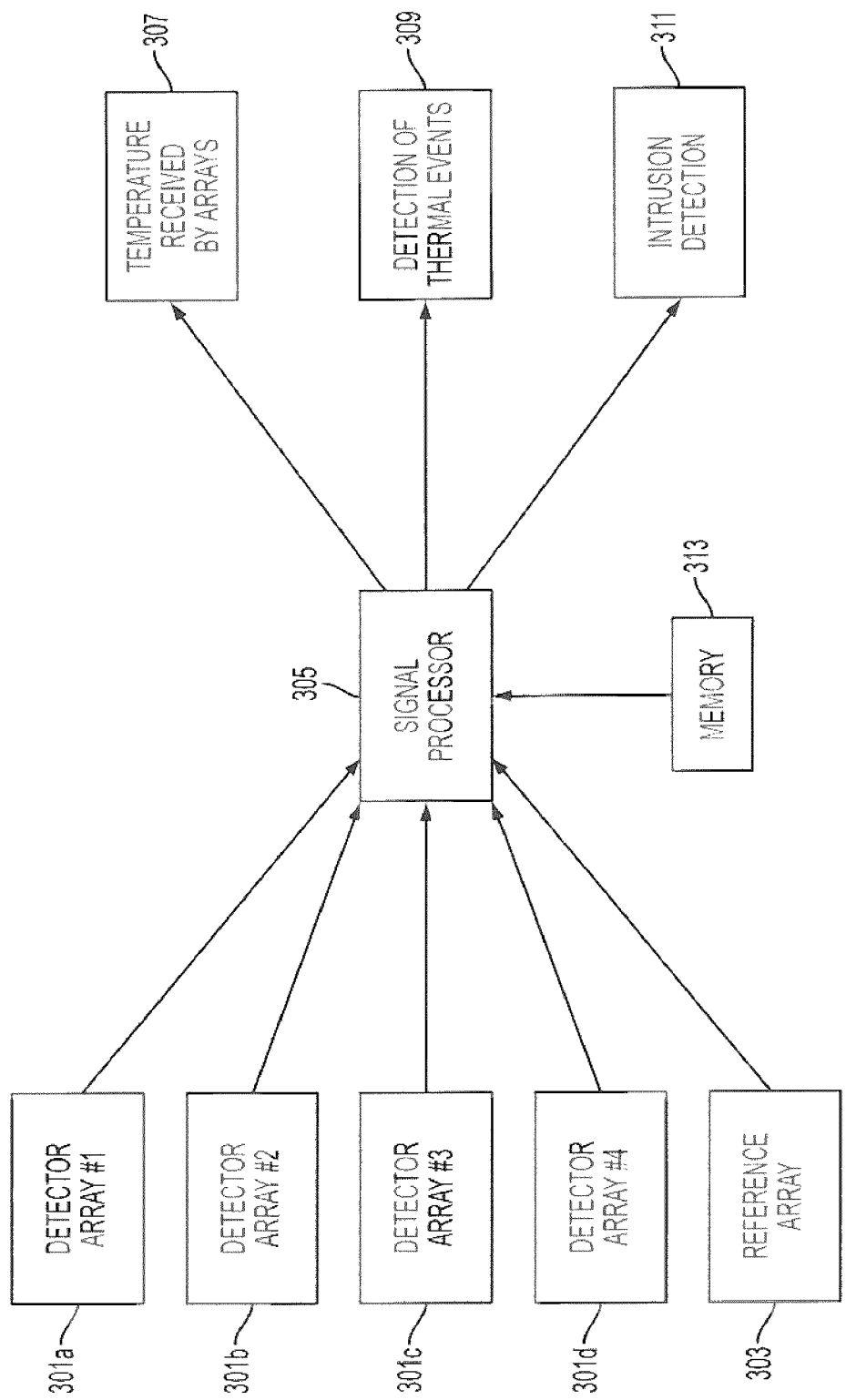
FIG. 3 is block diagram of an integrated passive microwave system for the passive medical assessment method for thermogenesis, obesity risk, unobtrusive non-contact monitoring of patients, intrusion detection and other detection of thermal events.

FIG. 3 is block diagram of an integrated passive microwave system for the passive medical assessment method for thermogenesis, obesity risk, unobtrusive non-contact monitoring of patients, intrusion detection and other detection of thermal events. Generally, a microwave radiation detector array 1-n where n=4, 301a to 301d may be provided for detecting microwave radiation from a subject or body part of a subject. A reference array is also provided that may be used, for example, for detecting a body temperature of a right hand maintained in a comfortable or reference mode while the left hand may be stressed by application of cold or is exercised to originate heat/energy change. In accordance with aspects herein, for any antenna array or antenna configuration, it can be desirable to calibrate an antenna using a reference target having a known temperature to provide a baseline reference temperature and a reference received energy level. One such method for calibration can involve using a Dicke switch method to compare the detected radiation with a known temperature source. Typical frequencies of operating a Dicke switch may be from 1 Hz to 10 KHz, with a conventional range being from 100 Hz to 1 KHz. The purpose of the Dicke switch is to correct for gain changes due to temperature drift in the electronics. With two sets of electronics (one looking at a stable reference and the other an unknown), both will drift equally with a common change in temperature.

A reference temperature can be provided by using a "hot load," for example, an object having a temperature of 100° C., and the microwave radiation emanating from that object can be measured to use as a baseline reference. Another baseline temperature that may be used is a floor temperature or other predeterminable reference temperature.

Other reference temperatures can be used depending on the configuration and application of the antennae. Various calibration sources for temperature already exist in the environment, both inside and out and naturally vary depending on the time of day and weather. For antennae that are worn or hand-held, the core human body (skull or chest cavity) or a rectal thermometer as suggested by Pennes may provide an appropriate reference temperature for measurement of other body parts such as skin. In indoor installations, the wall or floor may be used as a suitable reference source. In an outdoor installation, the ground can be used as a source of baseline reference energy because of its predictable temperature variance in view of time of day and weather conditions. Other outside references for temperature, for example, could include the temperature of the sun, the earth, or foliage of large trees may be used to establish a reference temperature and a reference received energy level for the surrounding environment.

A signal processor 305 may process the electrical signals received and quantify the signals as temperature levels and store them with a 0.1° C. accuracy in memory 313. The signal processor 305 shown in FIG. 3 at a central site may comprise elements 407 to 413 shown in FIG. 4. Memory 313 may also contain corresponding expected normal temperatures as demonstrated by the Pennes/Wissler model or other human temperature versus three dimensional location data or data collected for arterial, venous or capillary blood flow at given ambient temperature. At the central site, the received IF signal may be detected as a voltage at detector 407, provided to a video amplifier 409 and integrator 411 for integrating the baseband signal across a human noise band of interest, and displayed at display 413.

The output of the amplified signal, also referred to herein as a brightness temperature signal, may be interfaced to a laptop computer or smaller computer such as a personal hand-held or worn computer. In some embodiments, such a computer can include a display for displaying the voltage reading which is converted to a temperature. The output of signal processor 305 may relate to providing measures of gradient temperature, blood flow temperature over time, metabolic rate, temperature gradients at different radial depths of a body part and detection of related thermal events 309. These measures may be known or may be predictable by comparison with a norm or expected value such that, for example, tumors, first degree burns and the like may be diagnosed. Infection typically exhibits a higher body temperature value and may be detected at a gateway. According to one application, an antenna array 301 may be housed in metal screening apparatus used at a gateway such as an airport for detecting an individual that may be an intruder at 311 or carrying an infectious disease such as the aviary flu and so have an elevated body temperature at 307.

An exemplary medical assessment method apparatus for thermogenesis and obesity risk using passive microwave radio reception according to one or more aspects described in more detail herein may comprise various antenna detector arrays worn by the patient or located externally but directed toward the patient. For example, scanning a plurality of patients in a medical care unit may result in passively detecting radiation in one or more of the WARC protected frequency bands in the microwave range resulting in an unusual temperature reading depending on the body part of a patient under analysis.

Signal processing can be in the same or different location as the antenna arrays, and signals can be transmitted by wire or wireless means. If by wireless transmission, for example, within a wireless local area network according to IEEE 802.11, each such wirelessly transmitted signal can include a data signal uniquely indicative of the location of the array, antenna identification, antenna direction, frequency band and bandwidth detected so the signal can be appropriately identified.

Once the signals from the detector arrays 301a-301d and reference array 303 are processed, the results can be provided in a number of ways. According to one aspect described herein and as described below, the received microwave radiation can be converted into a signal wherein a voltage can be determined as result of the difference in radiation noise detected. In some embodiments, the radiation noise level detected is compared to a baseline ratio from, for example, a floor of a room, the ground, or other stable references.

Due to the mass production of commercial microwave antennas and associated electronics, the cost of passive microwave medical technologies is relatively low when compared to other technologies, such as infra-red thermal imaging. Low noise amplifier circuitry is now conventional and provides excellent low noise performance and permits discrimination from noise using antennae that are not high gain or large in size. A directional passive microwave antenna is preferred to avoid interference from natural sources of radiation such as the sun or a fire or other objects that may emit microwave radiation such as a vehicle or other combustion or chemical process, for example, for use in a medical device.

Figure 4:
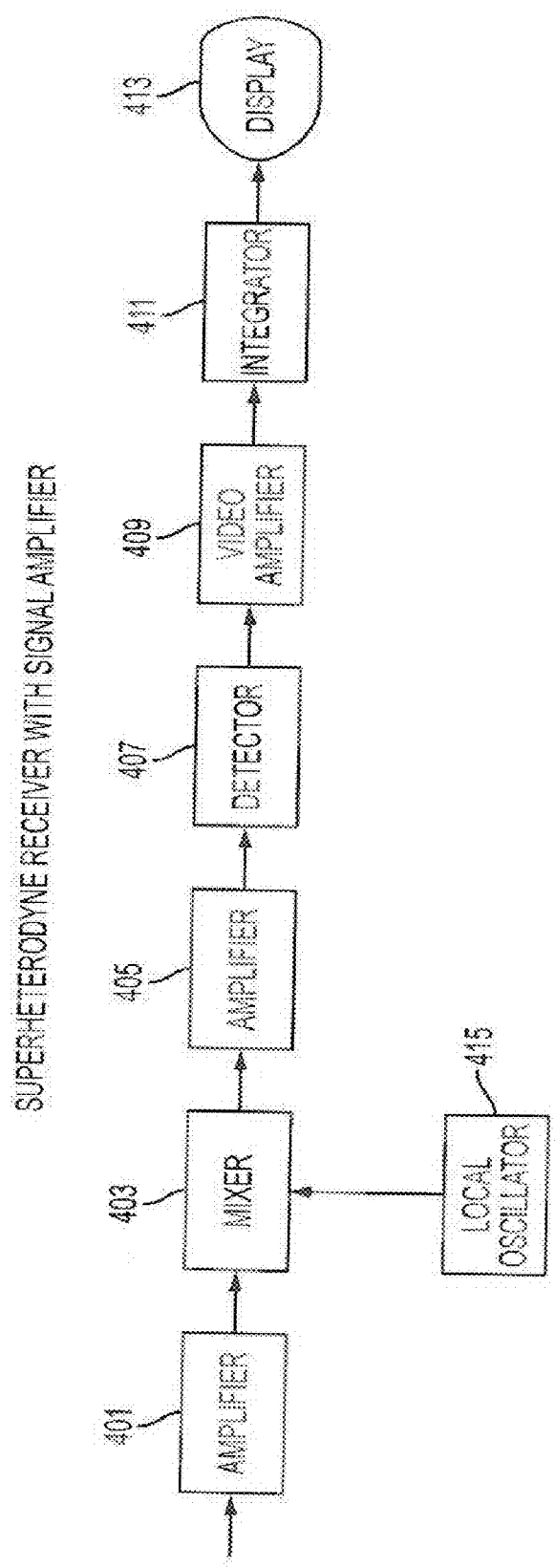
FIG. 4 is a schematic block diagram of a typical superheterodyne microwave receiver with a signal amplifier.
Figure 5:
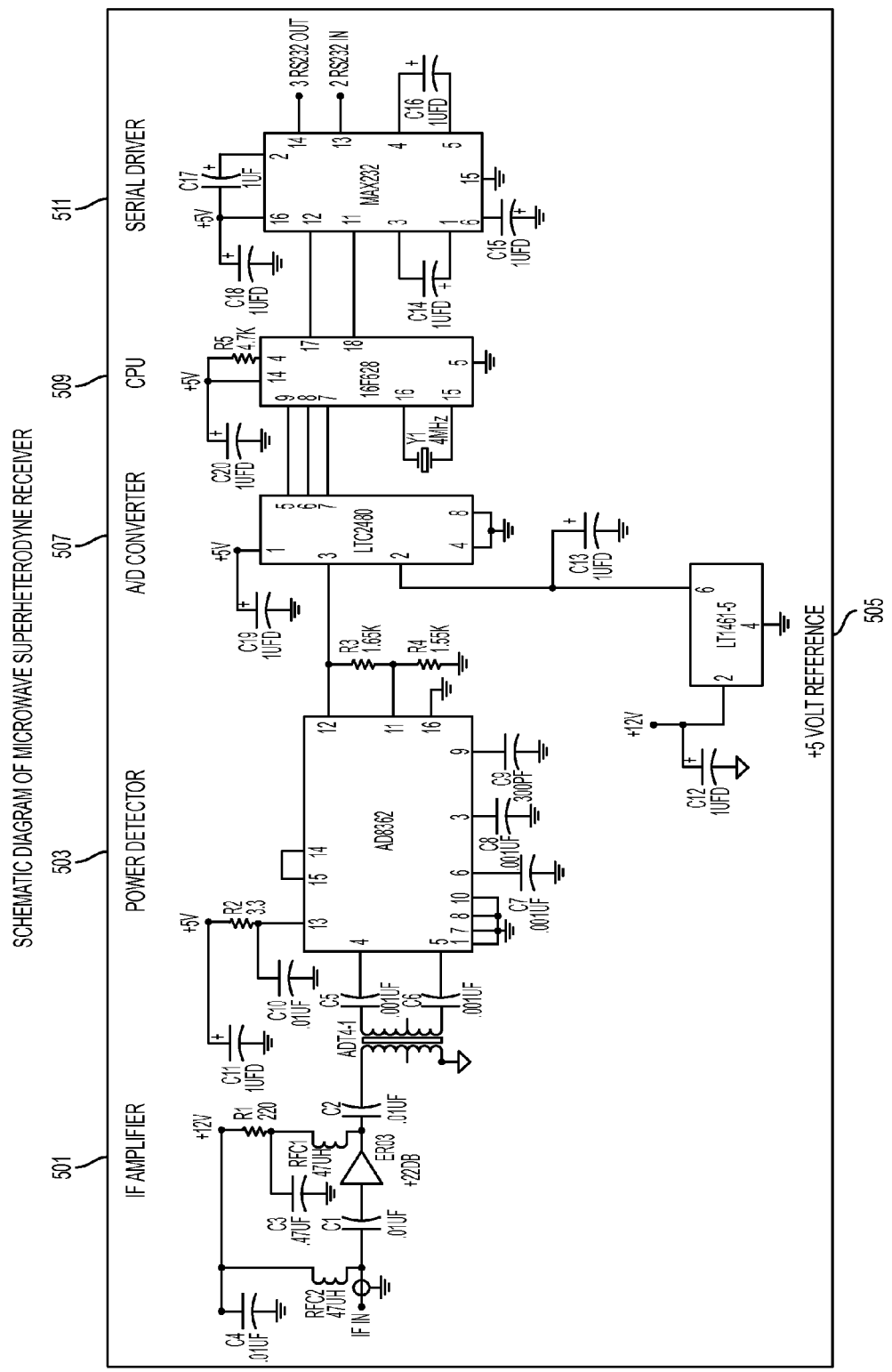
FIG. 5 is a detailed schematic diagram of a microwave superheterodyne receiver.

FIG. 4 is a schematic block diagram of a typical superheterodyne microwave receiver with a signal amplifier and FIG. 5 is a detailed schematic diagram of a microwave superheterodyne receiver. These receivers are known devices. The design will differ depending on choices of the number of noise-measuring channels per WARC protected frequency. As shown in FIG. 4, a superheterodyne receiver with a signal amplifier can comprise an amplifier 401, for example, a conventional low noise block amplifier or low noise amplifier possibly requiring a bandpass filter having superior noise performance, a mixer 403, and a local oscillator 415 for demodulating the received signal to an intermediate frequency (IF) signal, for example, in the 100 MHz to 1.5 GHz range. The IF signal may then be amplified at amplifier 405 and transmitted by wired or wireless means to a signal processor 305 at a central site as shown in FIG. 3 for further processing. As shown in FIG. 5, an intermediate frequency (IF) amplifier 501 may be tuned for the receive frequencies of one antenna array and may match impedances for optimum transmission of data regarding passively detected temperatures 307 (voltages). The output of such an IF amplifier 501 can be fed via a transformer (which can perform impedance matching, isolation and other functions) to a detector 503 such as a 50 Hz to 2.7 GHz analog detector circuit such as Analog Device AD 8362 circuit 503, which may be likewise tuned to a specific frequency or frequency range; (see FIGS. 6A and 6B for typical frequency bands). Its output in turn can be provided to circuitry 505 which includes a reference source voltage, for example, an LT1461-5 circuit 505 for providing a reference voltage of five volts for use at a LTC 2480 analog to digital converter 507. The digital output of A/D converter 507 can be provided to a CPU 509 for conversion into, for example, ASCII for data entry into a signal processing unit computer 305 and memory 313 shown in FIG. 3. The depicted CPU is one manufactured and known as a PIC16F628 microcontroller, but any suitable CPU can be used. The output of CPU 509 can be provided to a conventional serial driver 511 (for example, a 232 IC) for serial input to a signal processor/memory 305/313. In this manner, the output may be temperature compensated (via the Dicke switch) for a reference input and then fed to a central processing unit for analysis and, for example, display. Such a circuit may provide one input of many to signal processor 305 shown in FIG. 3. However, the design of such devices should be made to comply with the collection of a plurality of noise channels at varying depths of a human body toward a core using WARC protected frequencies as exemplified by the plots of FIGS. 6A and 6B.

In an alternative embodiment, a known self-balancing radiometer may be used in place of the well known Dicke radiometer which may require recalibration for each radial location collection of temperature data. In a self-balancing radiometer, input power is compared with power from an internal noise source. As a result of self-balancing, voltage at the output of a low-pass filter goes to zero and the result of measurement is independent of the gain of the radiometer. Sometimes referred to in the art as a noise additive receiver, temperature drift is compensated for by injecting a known amount of signal on top of the received signal and the difference is gain drift. An advantage of the noise additive receiver is that it does not affect the overall sensitivity of the receiver.

Figure 6B:
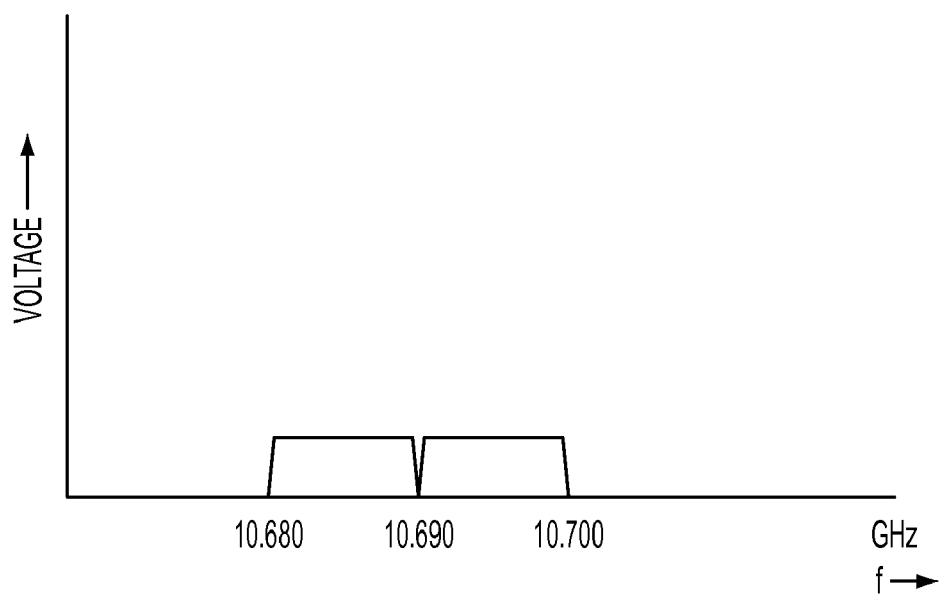
FIG. 6B is a frequency versus amplitude plot of a fourth and fifth noise measuring channel centered at 10.685 and 10.695 GHz respectively.

FIG. 6A is a frequency versus amplitude plot of first and second noise measuring channels at center frequencies, for example, of 1.40675 GHz and 1.42025 GHz and a third noise measuring channel centered at 2.695 GHz. FIG. 6A is only one example of dividing the 1.400 to 1.427 GHz spectrum into a plurality of channels. As has been described above, the 2.69 GHz frequency band may be divided into a plurality of noise channels as well. FIG. 6B is a frequency versus amplitude plot of a fourth and fifth noise measuring channel centered at 10.685 and 10.695 GHz respectively. The 10.68 GHz frequency range may be divided further into more noise measuring channels. Referring again to FIG. 2, these noise measuring channels may be used to determine temperature gradients at predetermined radial depths, depending on the body part under analysis and direction of body measurement from a body core toward skin surface, typically a radial direction, under varying or constant environmental conditions over time. The higher the frequency, the more directional the receiver may be and the more likely that the voltage signal/thermal response with be reflective of a skin surface body temperature, such as, for example, the use of a higher microwave frequency of 100 GHz to measure the surface temperature of the tympanic membrane or a low, less directional frequency may be employed to measure radiation from the hypothalamus.

Figure 7:
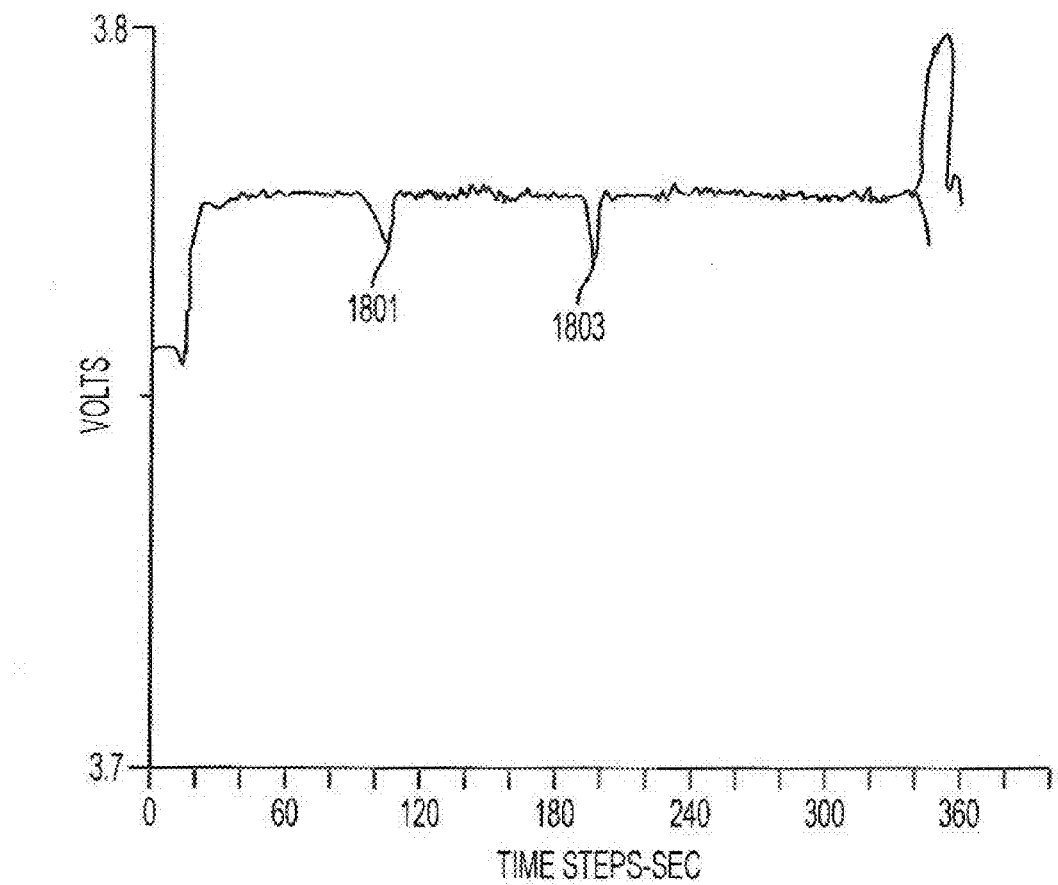
FIG. 7 is a plot of voltage versus time steps in seconds showing detection of a human at approximately 25 feet and 50 feet and corresponding temperatures measured in voltage levels by a passive microwave receiver.

FIG. 7 is a plot of voltage versus time steps in seconds showing detection of a human at approximately 25 feet 1801 and 50 feet 1803 and corresponding temperatures measured in voltage levels by a passive microwave receiver. Experimentally, a human subject was asked to stand at 25 feet 1801 and 50 feet 1803 away from a passive microwave receiver. Not only was the person detectable at such a distance, but their body temperature was given as a voltage signal readout 1801,1803 respectively. By measuring a plurality of noise channels and depending on directionality and capture of related external imaging, the measured individual may be evaluated for carrying an infectious disease.

Figure 8:
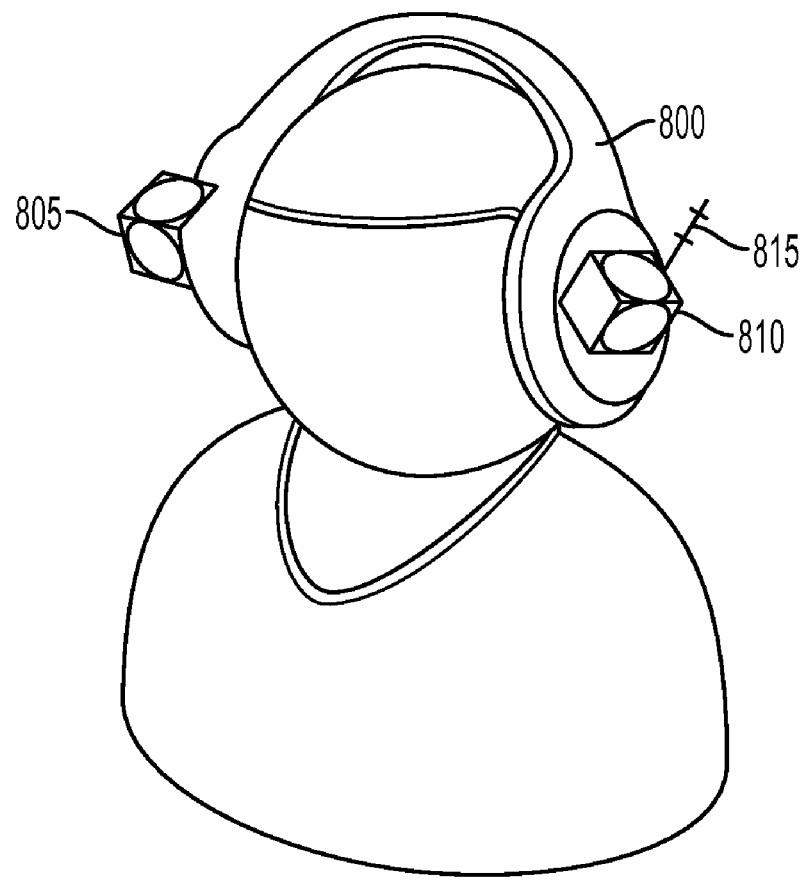
FIG. 8 depicts an exemplary embodiment of a wearable apparatus resembling headphones containing a microwave antenna array interfaced with a receiver in accordance with one of more aspects described herein.

FIG. 8 depicts an exemplary embodiment of a wearable apparatus 800 resembling headphones 805, 810 containing a microwave antenna array interfaced with a receiver in accordance with one or more aspects described herein. It is suggested that the ear is an excellent region of the human body for study due to its high concentration of capillaries. An exemplary embodiment of a wearable apparatus may resemble headphones containing a microwave antenna array interfaced with a receiver. In this embodiment, the patient's ears are the targeted source of radiation for which their temperature is measured. The headphones 805, 810 can be sanitized after each use. The signal from the headphones can be interfaced by wire or wireless means to a receiver, a signal processor and/or associated equipment, for example, using wireless LAN frequencies per IEEE 802.11 and the depicted antenna 815. Moreover, shielding may be provided around any internally directed antennae of a passive microwave receiver of each ear compartment and connected to ground, for example, a wire net radio frequency shield (not shown). A small parabolic microwave radio astronomy antenna is known that is approximately 4 inches in diameter and may comprise a portion of a passive microwave receiver directed inwards toward an associated ear that is operable to provide a plurality of ear noise measuring channels between 1.400 and 1.427 GHz. An exemplary antenna array may be similar to that depicted in FIGS. 6 and 7 of U.S. Pat. No. 5,563,610 to Reudink. Such an array or directional antenna may receive microwave frequencies via a first element provided with a low noise amplifier circuit such as, for example, a model RAS-1420 LNA providing 28 dB of gain in the 1.420 to 1.427 GHz 27 MHz pass band of interest, available from www.radioastronomysupplies.com. An electronic circuit similar to that of FIGS. 4 and 5 may provide for at least two noise channels for detecting noise differential generated between measurements of points $P_1$ and $P_2$ as per FIG. 2 and so detecting a temperature gradient or differential at depths depending on the composition of the human body part under analysis, namely, the ear. As will be further described herein, an assessment method for metabolic activity may include the steps of ingestion of an activity inducer such as caffeine and measurement over time of the voltage/temperature proportional response to the stimulus.

Figure 9:
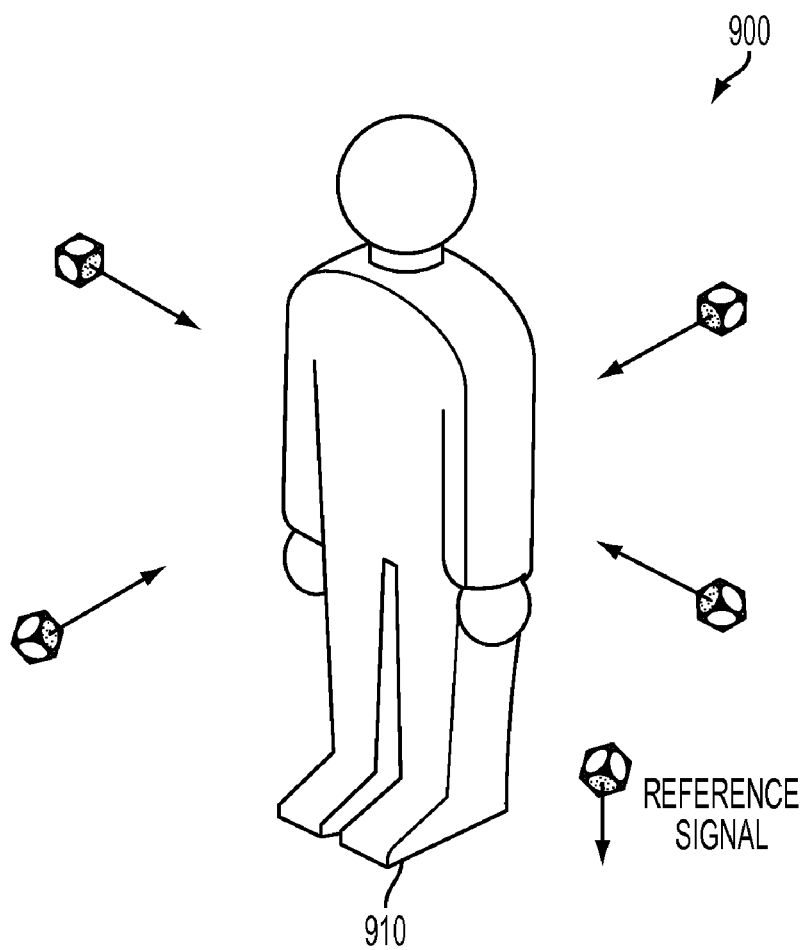
FIG. 9 depicts an exemplary embodiment of a handheld apparatus containing a microwave antenna array interfaced with a receiver in accordance with one of more aspects described herein.

FIG. 9 depicts an exemplary embodiment of a handheld apparatus 900 containing a microwave antenna array interfaced with a receiver in accordance with one of more aspects described herein. In this embodiment, gradient body temperatures of a person 910 exercising or standing still can be measured. Due to the directionality of the handheld apparatus 900, various portions of the body may be individually targeted and assessed based on choice of passive microwave receive frequency. Again, the signal from the handheld apparatus can be interfaced by wire or wireless means to a receiver, signal processor and associated equipment via an antenna, not shown.

Figure 10A:
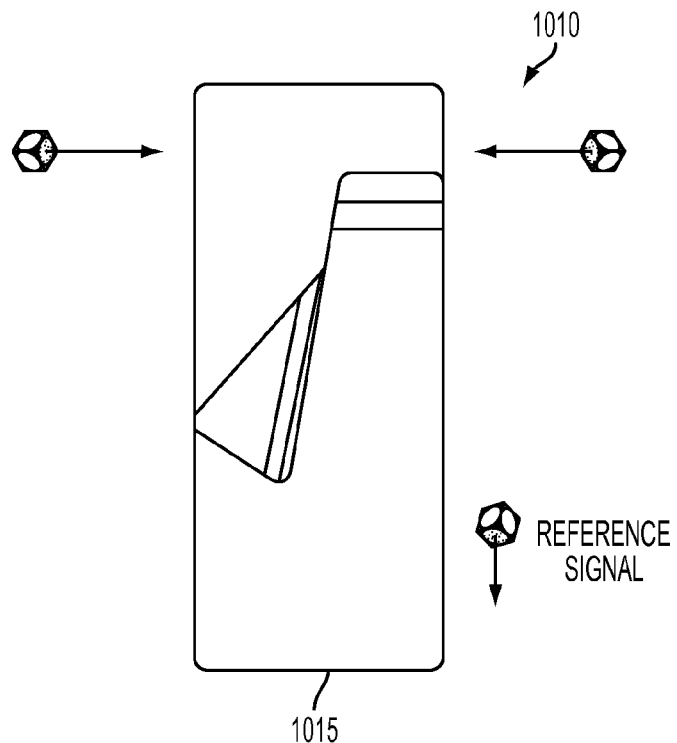
FIG. 10 depicts an exemplary embodiment of a fixed bedside apparatus containing a microwave antenna array in accordance with one of more aspects described herein.
Figure 10B:
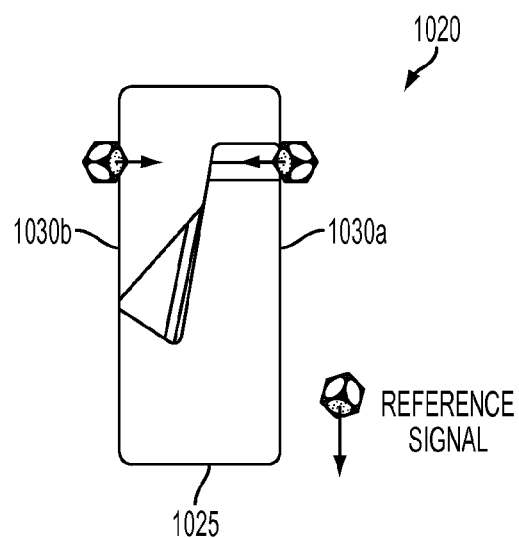

FIG. 10 depicts an exemplary embodiment of a fixed bedside apparatus 1010, 1020 containing a microwave antenna array in accordance with one of more aspects interfaced with a receiver, signal processor and associated instrumentation. For adults and children, this bedside apparatus can be affixed to the headboards of the bed, adult bed 1015 or infant hollow shell hospital bed 1025. A known dual energy X-ray absorptiometry (DEXA) device is typically placed about thirty inches above the patient body and sweeps. DEXA devices are utilized for determination of bone density and the like. A passive microwave receiver may provide measurements similar to those obtainable by a DEXA device without active radiation. A microwave antenna array may be associated with such DEXA apparatus or be utilized alone in a similar configuration. For infants, the antenna array 1020 can be affixed to the sides 1030*a* 1030*b* of the bed's carrier. Again, the signal from the bedside apparatus can be interfaced by wire or wireless to the receiver, signal processor and associated equipment. This embodiment would allow for remote temperature monitoring and data collection of patients without periodically disturbing them.

Figure 11A:
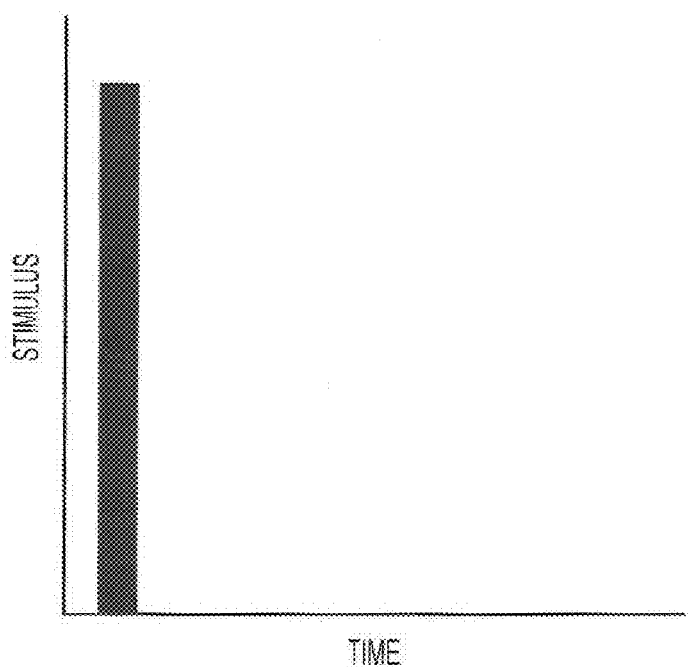
FIG. 11 is the expected evoked temperature response to thermogenic food and pharmacological stimuli.
Figure 11B:
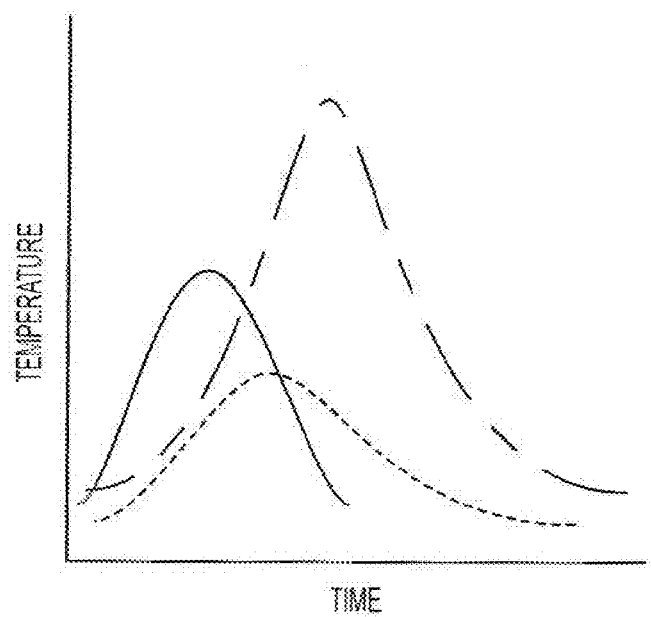

FIG. 11 is the expected evoked temperature response to thermogenic food and pharmacological stimuli (FIG. 11A) versus the theoretically expected evoked temperature response to thermogenic food and pharmacological stimuli (FIG. 11B). The stimulus is represented as a step function, while the evoked response predictably increases and then decreases over time as measured for a given body part. The response will vary depending on tissue content at the point at which the passive microwave receiver is directed, the frequency, depth of penetration, ambient temperature, any preexisting medical conditions such as a cancerous tumor, hypertension or other heat producing infection and other factors including possible allergic reaction.

Figure 12:
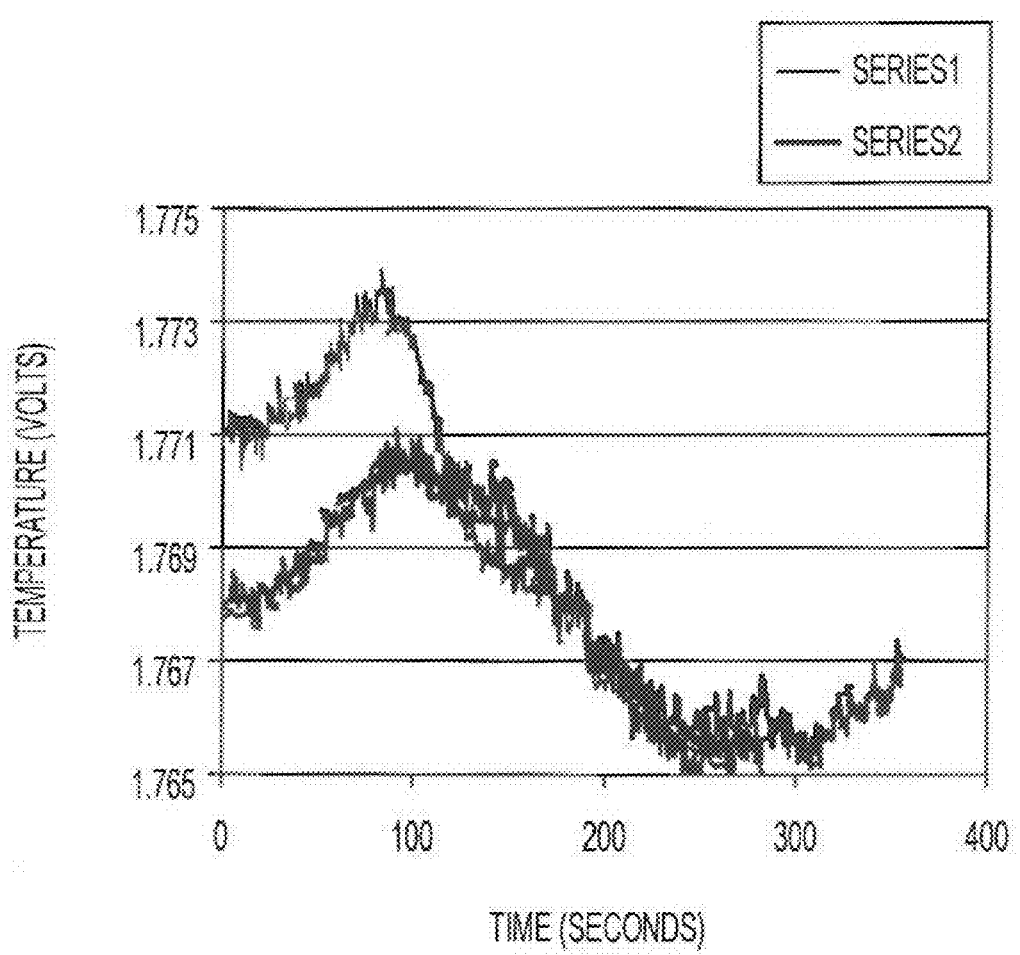
FIG. 12 contains graphs showing the time and temperature (voltage) responses of one human hand while the other hand is subjected to thermal stimuli by being immersion into rice water.

FIG. 12 contains graphs showing the time and temperature (voltage) responses of one human hand while the other hand is subjected to thermal stimuli by being immersed into ice water. These tests were conducted utilizing a thermocouple for skin temperature rather than utilizing a microwave receiver. While infrared sensing could have been used, a suitable inexpensive temperature sensor or thermocouple is available from www.pasco.com/engineering known as a PASPORT Temperature Sensor and associated skin/surface temperature flat sensor for skin surfaces. While the temperature of one hand of a test subject is being measured by the thermocouple, the other hand is immersed into a beaker of ice water. As the temperature of the free hand increases and then decreases, this temperature change demonstrates the evoked response. Depending on the metabolism rate of the test subject, different free hand metabolic responses are expected and depicted in FIG. 12. The thermocouple readings are shown as Series 1 for an individual who, for example, may demonstrate a higher metabolic response. Series 2 represents an individual with a lower metabolic response.

Assessment Method

Now an assessment method will be described in view of FIGS. 1-12. An endocrinologist will not intentionally cause a fever in a human, that is, an abnormal temperature. A doctor does not wish to create disease or infection that may cause an abnormal temperature gradient. On the other hand, stimulus may be applied to a body at rest or a body may be asked to perform predetermined exercise such as a stress test or be asked to permit occlusion of blood flow without body invasion or creating disease. Moreover, certain substances may be ingested which may stimulate a transient core body temperature change without lasting adverse reaction. Once a subject is placed at rest and a comfortable ambient temperature is recorded, a given body part is subjected to passive microwave readings at a plurality of noise measuring channels representing a plurality of radial depths at the given body part. These data, including ambient temperature of the environment, may be compared with Pennes/Wissler data to determine normal/abnormal conditions. As per FIG. 2, the radial composition of human tissue typically varies from skin to fat to muscle to bone. However, for example, the relative depths of different types of tissue will vary depending on the location on the human body under passive microwave receiver thermographic study. The differential microwave emission properties of bone, adipose tissue such as fat, muscle and skin may be determined and quantified as measurements of bone mineral content and density, measures of body fat and the like when compared to a norm. Visceral adipose tissue may be localized utilizing a passive microwave receiver without having to use active CT or MRI scanning.

Pennes/Wissler and related data for temperature distribution within the human body is three dimensional location dependent, (for example, where the needle thermocouple was specifically placed within the subject's arm) and ambient environmental temperature dependent. Consequently, the type and depth of human tissue at the location under study is plotted for comparison to determine a depth of microwave penetration at a given channel frequency for comparison with the Pennes/Wissler and related data. The resultant temperature data from Pennes/Wissler can then be compared with radial Z axis location and direction of passive microwave thermography to determine the expected temperature for a given frequency of noise-measuring microwave channel which in turn corresponds to a given point within a three dimensional human body per FIG. 2, such as $P_1$, $P_2$, or $P_3$ or $S_1$ or $S_2$.

The stimulation of a core temperature change may be induced, for example, by controlled exercise or, for example, the ingestion of nicotine, capsaicin (a food seasoning), caffeine or beta-adrenogic agent or agonist. Other possible ingestible substances that may cause a predictable core temperature change are theophylline or other methylxanthines. A nicotine gum, for example, provides rapid absorption via the oral mucosa and so a high degree of speed in the stimulus compared with caffeine, which may require a longer time for absorption. An alternative stimulus is stress caused by exercise or an extra-body event such as being required to listen to a loud, stressful noise.

In any event, the given stimulus may be compared with a predicted response and, from the temperature gradients measured at different radial depths and/or reflected in increased blood flow temperature at a given depth or at the surface provide an indicator from which a basal metabolic response may be calculated and compared with a predicted response. By utilizing varying substances in comparison with a norm, a course of treatment may be determined for a given condition such as obesity, diabetes or metabolic disease. A goal, for example, for obesity is to translate excess body fat into as much carbon dioxide as possible, for example, by provoking comfortable yet constantly higher metabolic rates than their basal metabolic rate by suitable diet or exercise. A passive microwave receiver for outputting an indication of basal metabolic rate could be utilized in the home by a patient to monitor their progress and storing historically calculated metabolic responses in memory for a given individual.

TEST RESULTS

Three tests have been conducted of the assessment method using passive microwave thermography apparatus on two different individuals, Subject A and Subject B. Subject A is especially of interest due to a preexisting medical condition of hypertension while Subject B is not known to react to the effects of stimulus by ingestion, for example, of caffeine.

Figure 13:
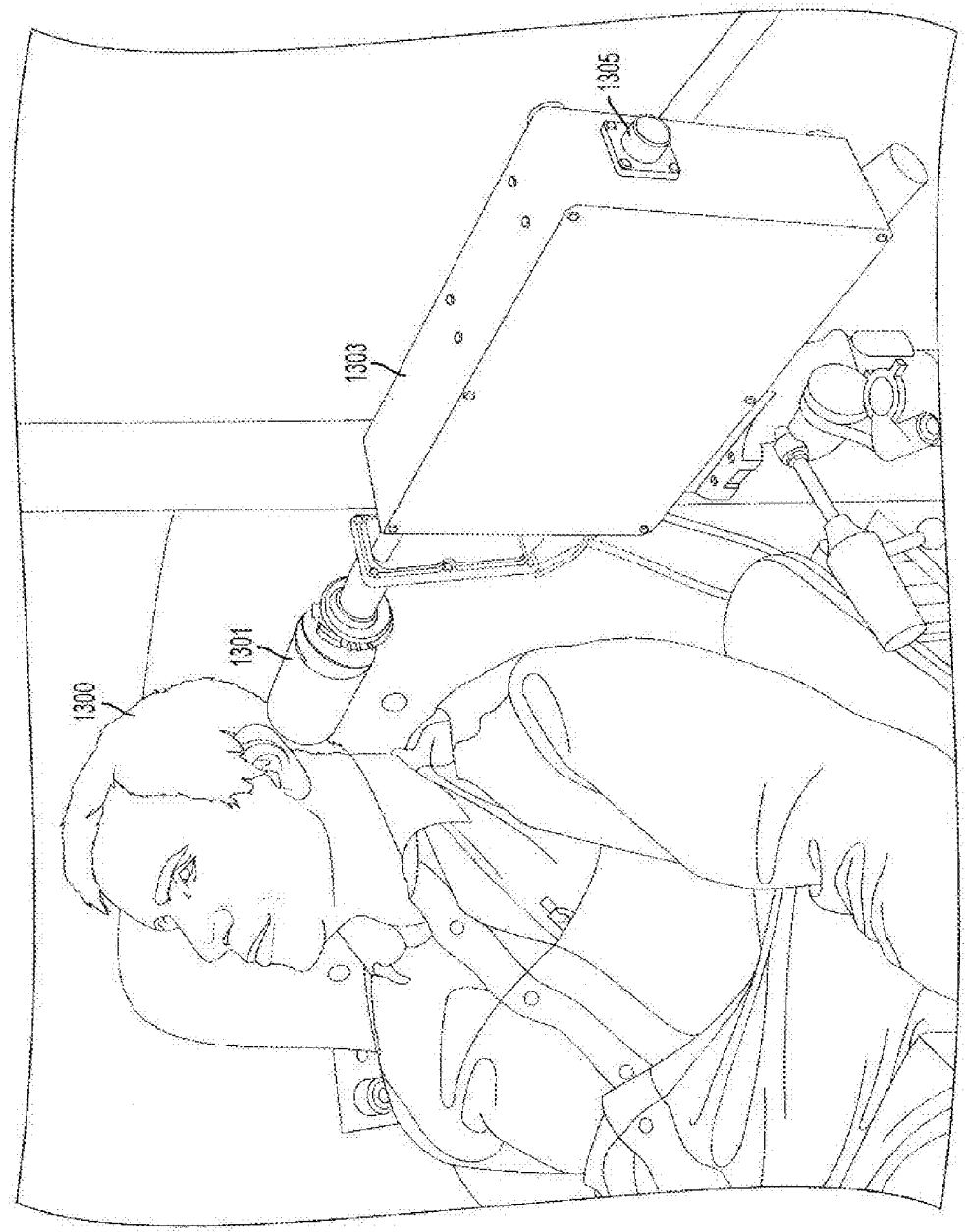
FIG. 13 shows an arrangement of passive microwave apparatus radially directed at an ear for passively receiving a signal at a selected microwave frequency.

Referring to FIG. 13, passive microwave apparatus comprises a directional antenna 1301. Directional antenna 1301 may comprise a standard microwave receiver for receiving a selected microwave frequency for a desired depth of penetration related to a target location on or in a subject at which the directional antenna is radially pointed. Directional antenna 1301 may comprise a substantially cylindrical microwave catcher open at its distal (subject) end. The apparatus further comprises a passive microwave receiver at 11.7 to 12.2 GHz where the receiving waveguide is surrounded by the microwave-catching cylinder 1301 so as to comprise a directional passive microwave antenna. Circuitry 1303 is provided for down-converting the received microwave radiation from the vicinity of the human's ear. The directional antenna 1301 is pointed radially at the ear of the subject 1300. In particular, antenna and waveguide 1301 represents a standard Ku band frontend from a satellite receiver which covers a microwave frequency range 11.7 to 12.2 Ghz. The passive microwave receiver circuitry within housing 1303 converts this 11.7 to 12.2 GHz frequency range down to an intermediate frequency (IF) of 950 to 1450 MHz. The receiver takes this IF and first filters it to remove all signals below 1000 MHz (high pass filter). Then the output of the high pass filter is mixed with a 1000 MHz local oscillator (low side injection or subtraction) to convert the IF range of 1000 to 1450 MHz to a baseband 0-450 MHz signal. The baseband signal is then passed thru a low pass filter with a cutoff of 400 MHz resulting in a 400 MHz wide noise-measuring channel Since 11.7-12.2 GHz is normally used for audio and television reception, a television receiver antenna is typically pointed in the direction of a geostationary satellite. By pointing the antenna 1301 radially at the human ear of the subject, noise from satellite signal reception is minimized.

The resulting 0 to 400 MHz noise measuring channel range is then amplified and passed to a power detector that provides 100 Mv output per Db of signal input. This dc signal is then passed via cable connector 1305 (cable not shown) to a known usb analog to digital converter for subsequent graphing per the depicted results of FIG.'s 14-16. The analog to digital converter recorded samples at one second intervals during the periods of the tests. A higher sampling rate than once per second may be useful for measuring other parameters or events that occur over a shorter period of time than a transient response to, for example, an ingested stimulus as per FIGS. 14-16. The embodiment of FIG. 4 basically conforms to the embodiment of circuitry 1303 but lacks the depiction of the above-mentioned high and low-pass filters.

Figure 14:
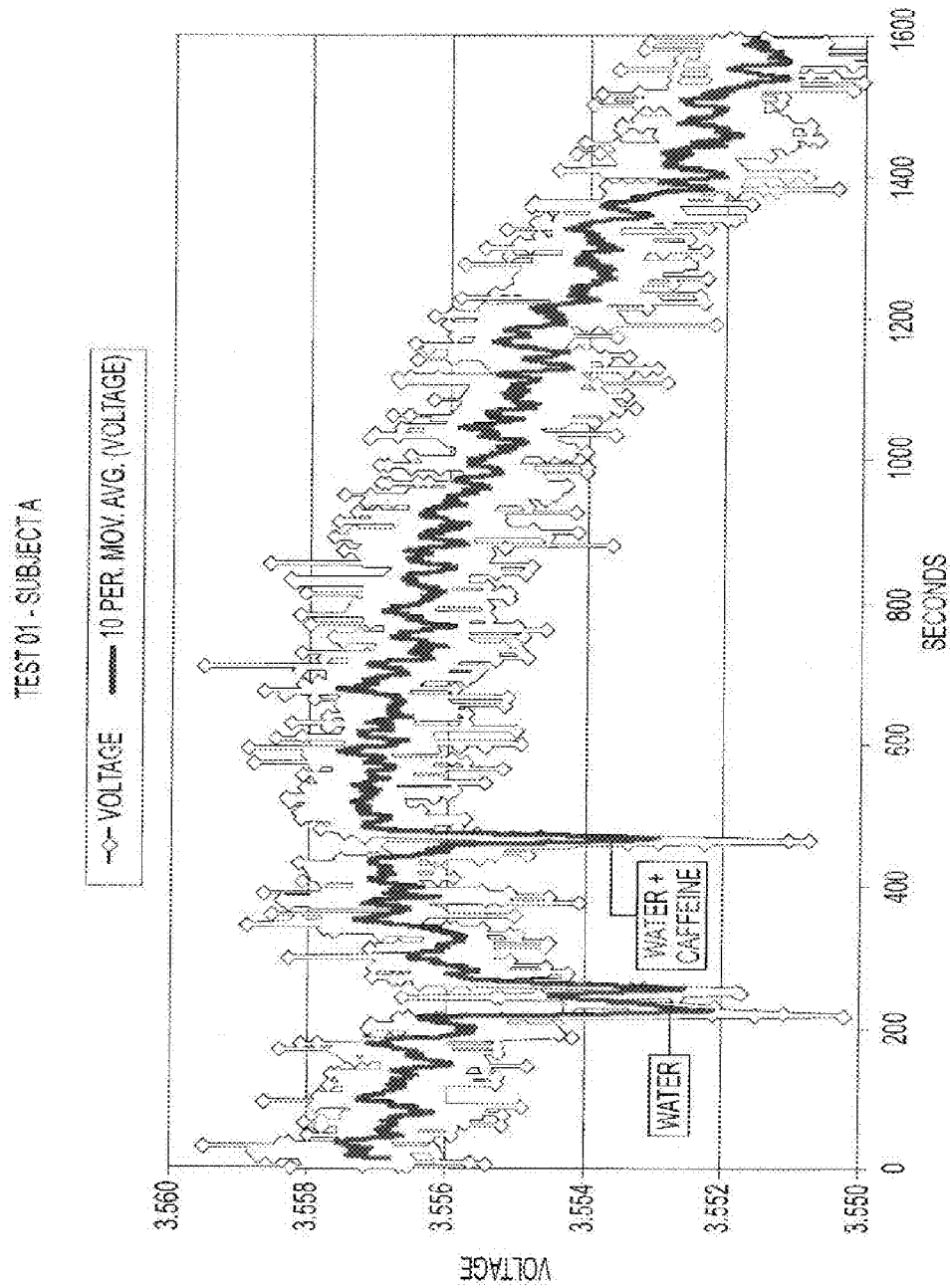
FIG. 14 is a graph of voltage versus time for a first subject showing an output of the passive microwave apparatus of FIG. 13 and instances of the first subject's sipping water and ingesting water and caffeine.
Figure 15:
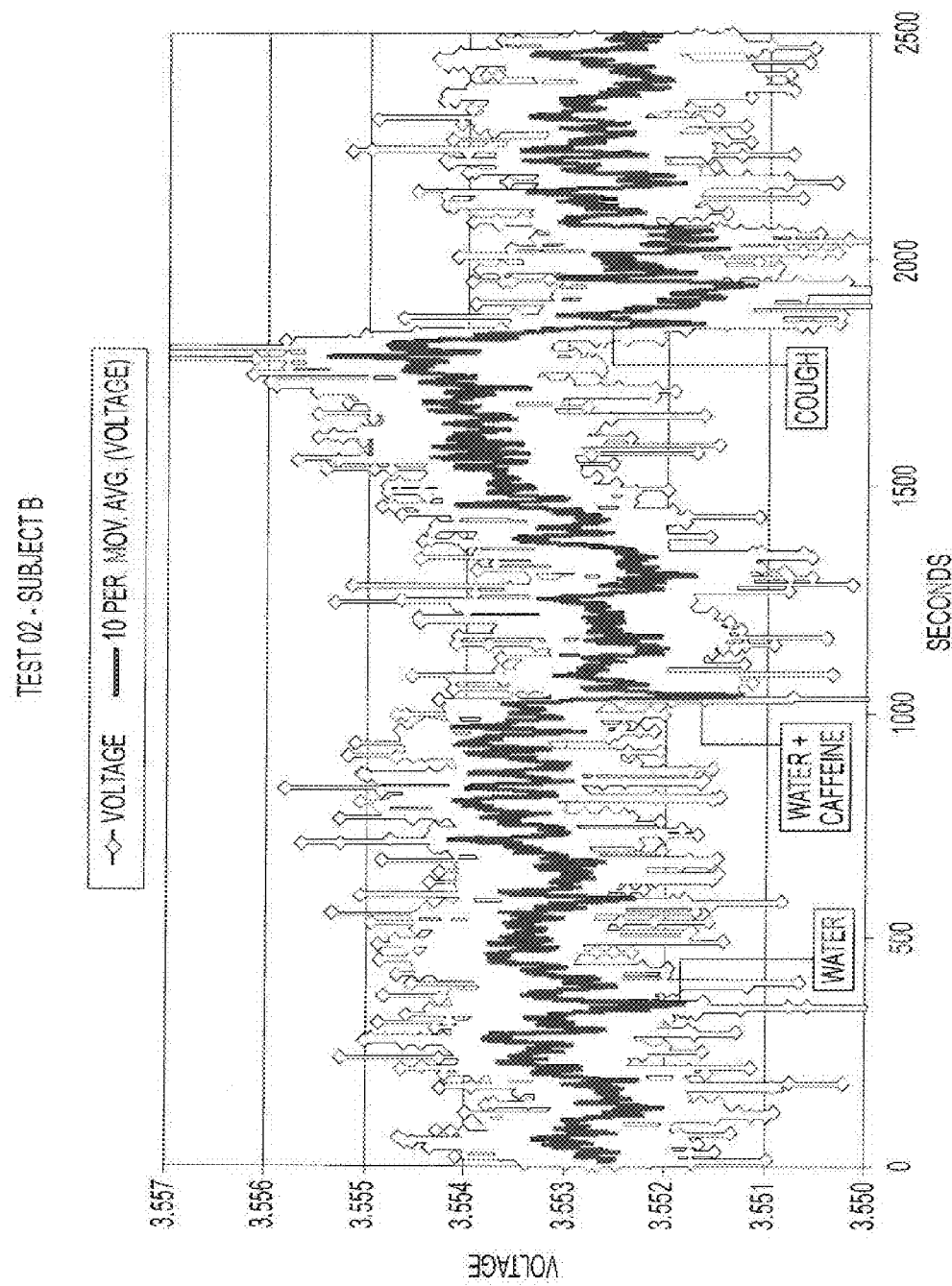
FIG. 15 is a graph of voltage versus time for a second subject showing an output of the passive microwave apparatus of FIG. 13 and instance of the second subject's sipping water, ingesting water and caffeine and coughing.
Figure 16:
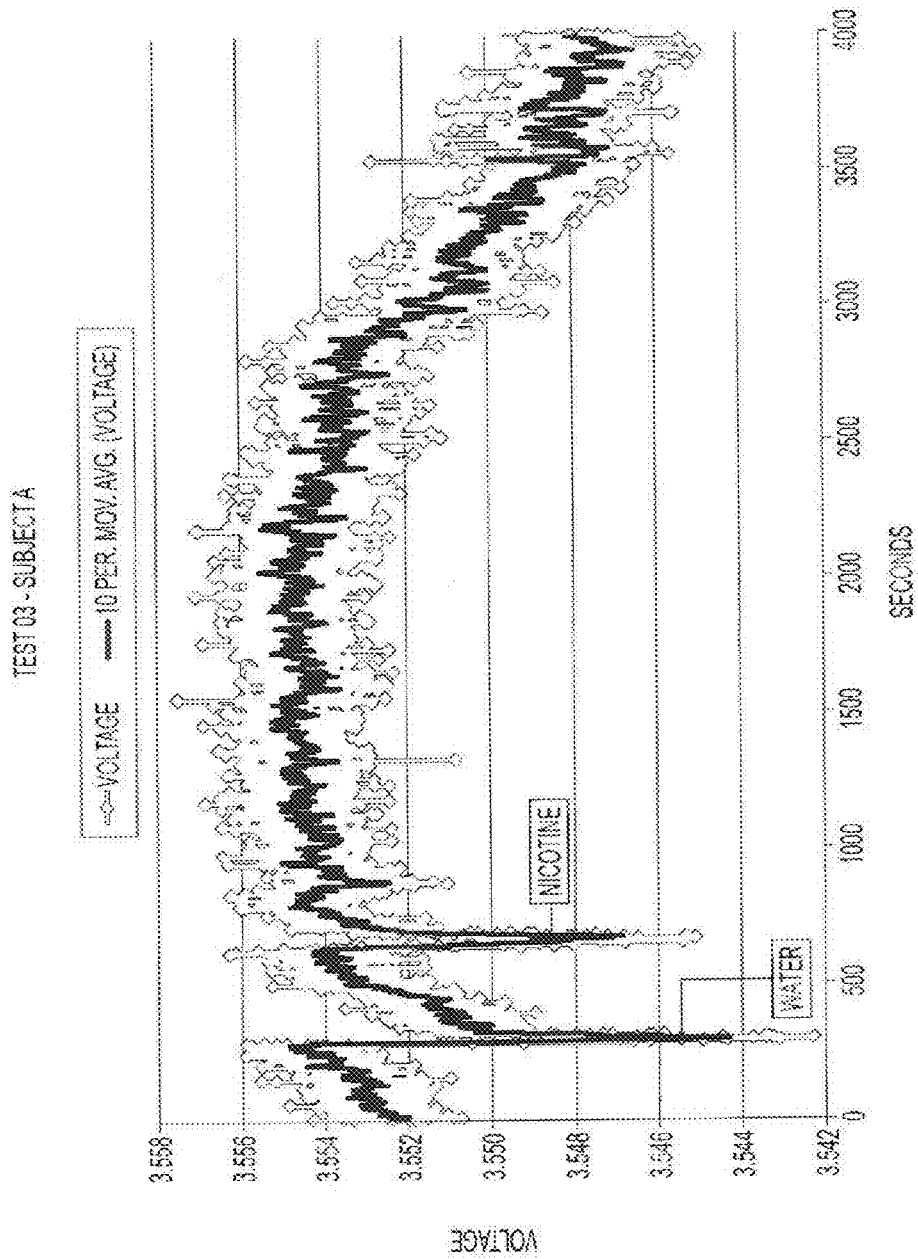
FIG. 16 is a graph of voltage versus time for the first subject showing an output of the passive microwave apparatus of FIG. 13 and instances of the first subject's sipping water and ingesting nicotine.

The depicted results of FIGS. 14-16 show diamonds representing individual voltage samples. Of greater significance is the solid, bold line graph in the center of each drawing which represents a moving average of ten measurements per time slot. For example, FIG. 14 clearly shows a drop in voltage signal (temperature) over the twenty minutes of Test 01 from the time of ingestion of caffeine. For a 12 degree Kelvin change at the input, there was exhibited approximately a 320 Mv de output. Consequently, there was approximately a 10 Mv change (or 1/32 of 12 degrees K.) or a 0.375 degree Kelvin change drop in skin temperature in the three tests. The 0.375 degree temperature change is believed to be within 50% of actual temperature change or the temperature change may be as high as 0.57 degree.

Because of the received microwave frequency being relatively high, it is assumed that the selected passive microwave frequency corresponds to a surface temperature reading of the ear skin surface, rather than at any depth within the ear. In each test, the subject 1300 is reclining in a comfortable chair as shown, at rest. The room environment in which the tests were conducted was maintained at constant temperature and humidity. The subject is asked to move as little as possible during the duration of each test. Subject A is described as a Caucasian male, 59 years of age, 6' 0" tall, weighing 200 pounds but having a preexisting hypertensive medical condition. Subject B is described as a Caucasian male, 54 years of age, 6' 0" tall, weighing 176 pounds but known to not exhibit much thermogenic response due to a caffeine stimulant.

FIG. 13 is a reconstruction of a photograph showing Subject B in a reclining position with the apparatus directed towards the external surface of his left ear. An InfraRed (IR) camera was also used at approximately the same view for measuring a surface temperature of a subject's exterior earlobe. The camera recorded a temperature of approximately 84 degrees Fahrenheit (28.9 degrees Celsius) for the surface skin temperature of the ear at rest.

While in a reclined position, Subjects A and B first consumed a sip of drinking water, followed by a sip of drinking water along with a 200 milligram caffeine tablet. FIG. 14 represents a time-varying graph of voltage over a time span of approximately twenty minutes or 1200 seconds (Test 01—Subject A). FIG. 15 also represents a time-varying graph of voltage over a time span of approximately twenty minutes (Test 02—Subject B). Both FIGS. 14 and 15 show the results of Subjects A and B drinking water at a temperature less than body temperature, respectively. Referring first to FIG. 14, Subject A, unlike subject B, and due to Subject A's preexisting condition exhibits vasoconstriction (a constriction of the blood vessels of the ear) causing a decrease in voltage output over time from the point in time of drinking water and ingesting caffeine.

The impact of, for example, sipping water is markedly more pronounced in the graphs of both FIGS. 14 and 16. This sipping of water is merely indicative of body movement to take the sip of water but has been marked on the graph for reference purposes. At a later point in time, each of subjects A (at 400 plus seconds per FIG. 14) and B (at 1000 plus seconds per FIG. 15) ingested water and caffeine. In both tests, a downturn in temperature is detected with both of these ingestion actions as indicated in FIG. 14 (Test 01—Subject A) and FIG. 15 (Test 02—Subject B). These again are related to head movement and are to be ignored.

With both subjects, after ingestion of the caffeine, there followed a slight upswing of voltage (proportional to temperature), then a downward voltage reading. During the test of Subject B, according to FIG. 15, a cough occurred which should be ignored from the transient temperature/voltage change which is more important to the assessment method tested. Note that in FIG. 15, the cough appears to have hastened a downward movement in ear surface temperature.

The same day but after a time period had lapsed, a third test was performed on Subject A which is reflected in FIG. 16 showing an approximately forty minute time period between ingestion of nicotine at approximately 700 seconds versus voltage/temperature measured at passive microwave receiver 1301, 1303 of the human ear skin temperature (Test 03—Subject A). While in a reclined position, Subject A consumed a sip of drinking water, followed by placing a nicotine 4 milligram lozenge on the floor of his mouth. Again, Subject A, having a preexisting condition of hypertension exhibits marked responses to the ingestion of nicotine over time due to Subject A's higher susceptibility to vasoconstriction. FIG. 16 depicts a downward spike in voltage at the point in time of drinking water and taking the lozenge which should be ignored followed by the transient temperature response for nicotine ingestion. As the lozenge melted in Subject A's mouth, there was a slight increase in voltage (skin temperature) reading between 700 seconds and approximately 1900 seconds, followed by a decline from 1900 seconds to the end of the test at 4000 seconds.

Thus, there have been described embodiments and aspects of apparatus and a method for passive microwave assessment of core temperature gradient at varying predetermined radial depths depending on selection of a noise measuring channel of a WARC or other noise-protected passive microwave frequency or other noise-free noise measuring channel dependent on geographic location or frequency outside protected frequencies as is known. A plurality of noise measuring channels may be focused, for example, radially at a region of interest in the human body to a wide range of uses only limited by the human imagination. For example, core body temperature, basal metabolic rate, temperature gradients at tissue interfaces, locations of infections and at a skin surface with the air, and the like may be determinable via a passive microwave receiver. These and other features will be known to one of ordinary skill in the art from studying the specification in view of the accompanying drawings and should only be deemed limited in scope by the claims which follow.

What is claimed is:

1. A system configured for the assessment of a human temperature gradient between at least two points at different radial depths of a human subject, the system comprising
   a passive microwave receiver for operation within a selected microwave frequency range of a plurality of WARC protected microwave frequency ranges, each WARC protected microwave range having a bandwidth, whereby the lower the selected microwave frequency range, the greater the depth of penetration for passive receipt of a noise signal from the human subject, a bandwidth of the selected microwave frequency range comprising at least two noise measuring channels, the passive microwave receiver comprising a directional antenna configured for radial direction toward a specific location on the skin surface of the human subject and toward a human body part comprising one of an ear, the hypothalamus, the nasopharyngeal cavity, the rectum, a breast, the heart, an arm, a hand, a leg, a foot and the tongue,
   wherein the selected WARC protected microwave frequency range comprises one of 1.400 to 1.427 GHz, providing a 27 MHz bandwidth; 2.690 to 2.700 GHz, providing a 10 MHz bandwidth; 10.680 to 10.700 GHz, providing a 20 MHz bandwidth; and 23.600 to 24.000 GHz, providing a 400 MHz bandwidth and the at least two noise measuring channels are configured to detect respective noise signals for assessment of the human temperature gradient between the at least two points at different radial depths of the human subject.

2. A system as recited in claim 1 wherein the quantity of the plurality of noise-measuring channels is selected such that a frequency difference between center frequencies of noise-measuring channels corresponds to an inter-spatial difference in depth between cells of the subject at the radial depth of the human subject.

3. A system as recited in claim 1 further comprising a computer and memory, the memory for storing three dimensional coordinates of a human body and corresponding expected temperatures for the coordinates of human tissue for comparison with measurements of the at least two noise measuring channels.

4. A system as recited in claim 1 further comprising a computer and memory, the memory for storing three dimensional coordinates of a human body and corresponding expected temperatures for the coordinates of blood vessels for comparison with measurements of the at least two noise measuring channels.

5. A system as recited in claim 1 wherein the selected microwave frequency range used by the passive microwave receiver comprises at least two WARC protected frequency ranges selected from 1.400 to 1.427 GHz, 1.6 to 1.7 GHz, 2.69 to 2.70 GHz, 10.680 to 10.700 GHz and 23.600 to 24.000 GHz.

6. A system as recited in claim 1 comprising head gear for surrounding left and right ears of the subject, the head gear for wireless connection to a signal processor, the head gear comprising first and second directional antennae, the first and second directional antennae configured for radial direction toward the left and right ears of the subject respectively.

7. An assessment method for assessing human metabolic response, the method comprising
   directing a directional antenna of a passive microwave receiver, the passive microwave receiver for receiving a plurality of noise signals from a corresponding plurality of adjacent noise-measuring channels within a selected microwave frequency range, the directional antenna configured for radial direction toward a given body part of a human under assessment for human metabolic response,
   determining from the selected microwave frequency range and from said radial direction toward the given body part of the human under assessment, corresponding radial depths of human body tissue from which the noise signals are passively received,
   correlating corresponding radial depths of the human under assessment from which the noise signals are passively received, and the corresponding radial depths of human body tissue, with stored data for temperature of a normal human body; and
   determining a temperature gradient from the passively received noise signals of the plurality of adjacent noise-measuring channels at the corresponding radial depths of human body tissue for assessing human metabolic response.

8. The assessment method as recited in claim 7 further comprising introducing a stimulus to the human under observation, determining a temperature gradient for the plurality of noise-measuring channels and corresponding radial depths.

9. The assessment method as recited in claim 8 wherein the stimulus comprises ingestion of a substance having the properties of rapid absorption by the human under assessment and provoking a transient increase in core body temperature of the human under assessment.

10. The assessment method as recited in claim 8 wherein the stimulus comprises controlled exercise.

11. The assessment method as recited in claim 8 wherein the stimulus comprises temperature stress of a human body part.

12. The assessment method as recited in claim 7 for use at a gateway configured for assessing humans crossing a border via the gateway, the assessment method for use in detecting a human carrier of infectious disease of the humans under assessment attempting to cross the border via the gateway.

13. The assessment method as recited in claim 7 wherein the ambient environmental temperature is maintained at a constant.

14. The assessment method as recited in claim 7 further comprising introducing a known temperature inducing stimulus to said human subject wherein the temperature inducing stimulus comprises one of a dosage of caffeine, a dosage of nicotine and stress prior to determining the temperature gradient.

15. The assessment method as recited in claim 7 wherein the selected microwave frequency range is a selected WARC protected frequency range comprising 10.680 to 10.700 GHz, providing a 20 MHz bandwidth.

16. The assessment method as recited in claim 7 wherein the selected microwave frequency range is a selected WARC protected frequency range comprising 2.69 to 2.70 GHz, providing a 10 MHz bandwidth.

17. The assessment method as recited in claim 7 wherein the selected microwave frequency range is a selected WARC protected frequency range comprising 23.600 to 24.000 GHz, providing a 400 MHz bandwidth.

18. The assessment method as recited in claim 7 wherein the selected microwave frequency range is a selected WARC protected frequency range comprising 1.400 to 1.427 GHz providing a 27 MHz bandwidth.

19. A system configured for the assessment of a human temperature gradient between two points, each point at a different calculated radial depth of a human subject, the different radial depths being calculated based on different microwave frequencies of respective noise measuring channels and based on relative water composition of skin, fat, muscle and bone tissue of the human subject, the system comprising a passive microwave receiver for operation within a selected microwave frequency range of a plurality of WARC protected microwave frequency ranges, the selected microwave frequency range comprising two respective noise measuring channels for passively receiving noise signals from the two points at the different calculated radial depths of the human subject, the passive microwave receiver comprising a directional antenna configured for radial direction toward tissue of the human subject including the two points at the different calculated radial depths of the human subject, the two points being located at the different calculated radial depths within a selected human body part of the human subject, a computer coupled to the passive microwave receiver, and a memory for storing noise voltage measurements of the two passively received microwave noise measuring channels over time, the computer calculating the human temperature gradient from the noise voltage measurements.

20. The system as recited in claim 19 wherein said memory further comprises data representing three dimensional coordinates of a human body and corresponding expected temperatures for the coordinates of one of human tissue and a blood vessel for comparison with measurements of the two respective noise measuring channels.

21. The system as recited in claim 19 wherein said selected microwave frequency range comprises a selected WARC protected frequency range including 1.400 to 1.427 GHz comprising 27 megaHertz of bandwidth, said passive microwave receiver also for operation at a "primary shared with active" frequency range of 1.6 to 1.7 GHz comprising 100 megaHertz of bandwidth.

22. The system as recited in claim 21 wherein said 100 megaHertz of bandwidth comprises two noise measuring channels of greater than 10 MHz bandwidth separated by a guard band.

23. The system as recited in claim 19 wherein the selected microwave frequency range is a selected WARC protected frequency range comprising 10.680 to 10.700 GHz, providing a 20 MHz bandwidth.

24. The system as recited in claim 19 wherein the selected microwave frequency range is a selected WARC protected frequency range comprising 2.69 to 2.70 GHz, providing a 10 MHz bandwidth.

25. The system as recited in claim 19 wherein the selected microwave frequency range is a selected WARC protected frequency range comprising 23.600 to 24.000 GHz, providing a 400 MHz bandwidth.

26. The system as recited in claim 19 wherein the selected microwave frequency range is a selected WARC protected frequency range comprising 1.400 to 1.427 GHz, providing a 27 MHz bandwidth.

* * * * *